(12) United States Patent
Li

(10) Patent No.: US 10,043,123 B2
(45) Date of Patent: Aug. 7, 2018

(54) ELECTRONIC EQUIPMENT

(71) Applicant: TENDYRON CORPORATION, Beijing (CN)

(72) Inventor: Dongsheng Li, Beijing (CN)

(73) Assignee: TENDYRON CORPORATION, Beijing (CN)

( * ) Notice: Subject to any disclaimer, the term of this patent is extended or adjusted under 35 U.S.C. 154(b) by 0 days.

(21) Appl. No.: 15/550,641

(22) PCT Filed: Jan. 28, 2016

(86) PCT No.: PCT/CN2016/072441
§ 371 (c)(1),
(2) Date: Aug. 11, 2017

(87) PCT Pub. No.: WO2016/127815
PCT Pub. Date: Aug. 18, 2016

(65) Prior Publication Data
US 2018/0025265 A1    Jan. 25, 2018

(30) Foreign Application Priority Data

Feb. 11, 2015 (CN) .......................... 2015 1 0073705
Jun. 24, 2015 (CN) .......................... 2015 1 0355512

(51) Int. Cl.
*G06K 19/07* (2006.01)
*G06K 19/077* (2006.01)

(52) U.S. Cl.
CPC ..... *G06K 19/0709* (2013.01); *G06K 19/0715* (2013.01); *G06K 19/0723* (2013.01); *G06K 19/07779* (2013.01)

(58) Field of Classification Search
None
See application file for complete search history.

(56) References Cited

U.S. PATENT DOCUMENTS 6,168,083 B1 * 1/2001 Berger .................. G06K 19/07
235/439
8,616,984 B2 * 12/2013 Mattice .................... G07F 1/06
463/25
2010/0088543 A1    4/2010 Watanabe et al.

FOREIGN PATENT DOCUMENTS

CN        2620326 Y       6/2004
CN        1834983 A       9/2006
(Continued)

OTHER PUBLICATIONS

International Search Report and English Translation dated Mar. 24, 2016 for International Application No. PCT/CN2016/072441 filed Jan. 28, 2016.

(Continued)

*Primary Examiner* — Kristy A Haupt
(74) *Attorney, Agent, or Firm* — Baker & Hostettler LLP

(57) ABSTRACT

An electronic device includes: a coil, a chip with a contactless function, a rectifier and a switcher. The switcher is connected between the coil and the chip. A first output terminal of the coil is connected to a first input terminal of the rectifier and a second input terminal of the chip. The coil is configured to sense a field and output an AC signal; the rectifier is used for receiving an AC signal input by the coil and outputting electric power through a second output terminal of the rectifier. The switcher is used for connecting the coil with the chip under an input operating voltage, and controlling a connection or disconnection of the coil and the chip according to a control signal when the control signal is received.

20 Claims, 6 Drawing Sheets

(56) References Cited

FOREIGN PATENT DOCUMENTS

| | | |
|---|---|---|
| CN | 1845130 A | 10/2006 |
| CN | 101714220 A | 5/2010 |

OTHER PUBLICATIONS

Written Opionion of the International Searching Authority and English Translation dated Mar. 24, 2016 International Application No. PCT/CN2016/072441 filed Jan. 28, 2016.

* cited by examiner

ELECTRONIC EQUIPMENT

CROSS-REFERENCE TO RELATED APPLICATIONS

This application is a Section 371 National Stage Application of International Application No. PCT/CN2016/072441, filed Jan. 28, 2016, the content of which is incorporated herein by reference in its entirety, and published as WO 2016/127815 on Aug. 18, 2016, not in English.

FIELD

The present disclosure relates to a field of an electronic technology, and more particularly relates to an electronic device.

BACKGROUND

In prior arts, when an electronic device such as a smart card communicates with a reader-writer, the smart card is connected to a coil of the reader-writer (a POS machine, an NFC phone etc.) via a coil. At the same time, the smart card may be supplied with electricity via the coil of the reader-writer. However, the existing smart card fails to make an effective usage of field energy generated by the reader-writer, which may lead to a waste of electric power of the coil of the reader-writer.

SUMMARY

Embodiments of the present disclosure seek to solve at least one of the problems existing in the related art to at least some extent.

The present disclosure aims to provide an electronic device.

To achieve the objective, the technical solutions of the present disclosure are realized as follows.

A first aspect of the present disclosure provides an electronic device, including: a coil, a chip with a contact-less function, a rectifier and a switcher, in which the switcher is connected between the coil and the chip, a first output terminal of the coil is electrically connected to a first input terminal of the rectifier and is electrically connected to a second input terminal of the chip via the switcher, in which the coil is configured to sense a field and configured to output an alternating current (AC) signal via the first output terminal; the rectifier is configured to receive the AC signal input by the coil via the first input terminal, and to output electric power via a second output terminal of the rectifier; and the switcher is configured to connect the coil to the chip under an input operating voltage, and to control a connection or disconnection of the coil and the chip according to a control signal when the control signal is received.

Compared to the prior arts, an electronic device provided in embodiments of the present disclosure, when a rectifier shares a coil with a chip having a contact-less function and when the connection between the coil and the chip is conducted, may acquire electricity from the coil thereof at the same time when performing Near Field Communication (NFC) with other devices, in which the electricity acquired is configured to support the electronic device to work or to charge a power supply configured in the electronic device, such that the communication and electricity acquisition may be performed at the same time, thus improving utilization of the electronic device and avoiding waste of electric power. Additionally, according to the embodiments of the present disclosure, a path between the coil and the chip may be switched off, and since the chip does not consume electricity any more when the chip and the coil are disconnected, the rectifier may be able to receive electricity to maximum extent for supplying electricity, which may improve efficiency of the rectifier for acquiring electricity. Additionally, in the embodiments of the present disclosure, since a switcher is added between the coil and the chip, a problem that the rectifier and the chip cannot be connected to the common ground may be solved, such that the electronic device may work normally.

BRIEF DESCRIPTION OF THE DRAWINGS

In order to make technique solutions according to embodiments of the present disclosure more apparent, drawings needed to be used in descriptions of the embodiments will be illustrated in the following. Obviously, the drawings to be illustrated in the following only represent some embodiments of the present disclosure, and other drawings can be obtained according these drawings by those having ordinary skills in the related art without making creative labors.

DETAILED DESCRIPTION

Figure 1:
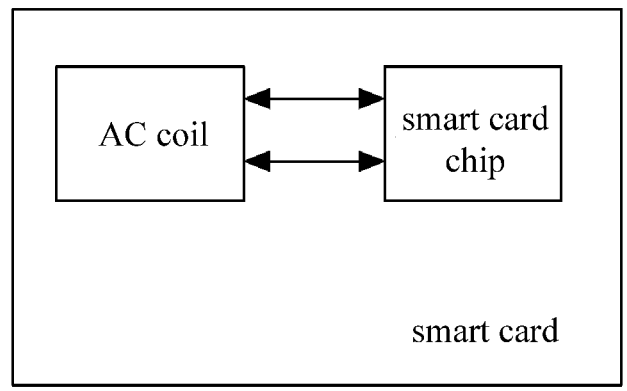
FIG. 1 is a structure diagram of a smart card in prior arts.

The technical solutions in the embodiments of the present disclosure are clearly and completely described in the following with reference to the accompanying drawings in the embodiments of the present disclosure. Obviously, the embodiments in the following description are merely a part rather than all of the embodiments of the present disclosure. Based on the embodiments of the present disclosure, all other embodiments obtained by persons of ordinary skill in the art without creative efforts shall fall within the protection scope of the present disclosure.

In the specification, it should be understood that, relative terms such as "central", "longitudinal", "lateral", "above", "below", "front", "rear", "right", "left", "horizontal", "vertical", "top", "bottom", "inner", "outer" should be construed to refer to the orientation and positions as then described or as shown in the drawings under discussion. These relative terms are for convenience of description and do not require that the present disclosure be constructed or operated in a particular orientation. Moreover, it is not required that the present disclosure is constructed or operated in a particular orientation. In addition, terms such as "first" and "second" are used herein for purposes of description and are not intended to indicate or imply relative importance or significance or to imply the number of indicated technical features.

In the description of the present disclosure, it should be noted that, unless specified or limited otherwise, the terms "mounted," "connected," and "coupled" and variations thereof are used broadly and encompass such as mechanical or electrical mountings, connections and couplings, also can be inner mountings, connections and couplings of two components, and further can be direct and indirect mountings, connections, and couplings, which can be understood by persons of ordinary skill in the art according to the detail embodiment of the present disclosure.

In the following, embodiments of the present disclosure will be described in detail with reference to the accompanying drawings.

Embodiment 1

In prior arts, for example, an electronic device is a smart card, as shown in FIG. 1, the smart card includes: a coil and a smart card chip connected to the coil directly. As long as the smart card is in a field (i.e., the smart card is placed in a radio-frequency field of other devices (such as a card reader, a phone)), a circuit of the smart card chip may consume field energy, an electricity acquisition circuit is unable to share the coil with the smart card chip to realize an optimum electricity acquisition efficiency, while the addition of an electricity acquisition coil may increase complexity and cost of circuit and may affect communication between the smart card and a device. Thus, it is an urgent difficulty to be solved for the smart card how to make the electricity acquisition circuit (which is also called as "rectifier" in this embodiment) share the coil with the smart card chip without adding an electricity acquisition coil and to increase the electricity acquisition efficiency of the electricity acquisition circuit.

Figure 2:
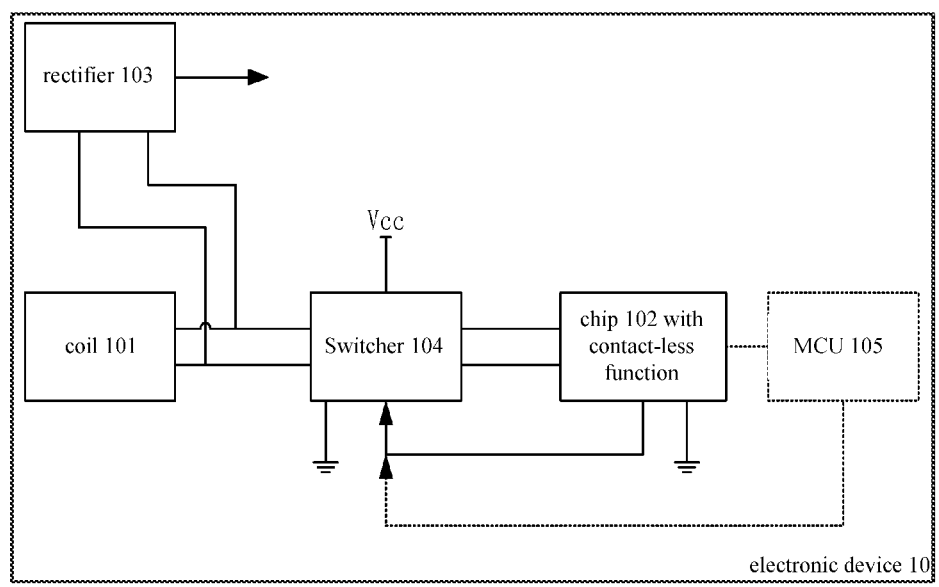
FIG. 2 is a structure diagram of an electronic device according to Embodiment 1 and Embodiment 3 of the present disclosure.

According to the embodiment of the present disclosure, an electronic device 10 is provided. FIG. 2 is a structure diagram of an electronic device according to the embodiment of the present disclosure. As shown in FIG. 2, the electronic device 10 according to the embodiment of the present disclosure includes: a coil 101, a chip 102 with a contact-less function, a rectifier 103 and a switcher 104.

In a technical solution provided by the embodiment of the present disclosure, a first output terminal of the coil 101 is connected to a first input terminal of the rectifier 103 and a first terminal of the switcher 104 respectively, and a second output terminal of the coil 101 is connected to a second input terminal of the rectifier 103 and a second terminal of the switcher 104 respectively, in which the first output terminal and the second output terminal of the coil 101 are configured to output AC signals opposite in phase. Thus, at least one of a first ON/OFF circuit 904 and a second ON/OFF circuit 905 (see Embodiment 8 and FIG. 9) is in an ON state when the switcher 104 is in the ON state.

A third terminal of the switcher 104 is connected to a first input terminal of the chip 102, and a fourth terminal of the switcher 104 is connected to a second input terminal of the chip 102.

A fifth terminal of the switcher 104 is configured to receive an operating voltage, such that the coil 101 is connected with the chip 102. In this embodiment, in an initial state, the fifth terminal of the switcher 104 receives the operating voltage, and the coil 101 is connected with the chip 102 under the operating voltage. The coil 101 is kept to be connected with the chip 102 by default when no control signal is received.

A sixth terminal of the switcher 104 is configured to receive the control signal, and the switcher is configured to be controlled to transfer to an ON state or an OFF state according to the control signal. The coil and the chip are controlled to be disconnected when the switcher is in the OFF state; and the coil and the chip are controlled to be connected when the switcher is in the ON state.

In a technical solution provided by the embodiment of the present disclosure, the electronic device includes but is not limited to the smart card or other electronic devices configured with an NFC function. When the electronic device 10 is configured to perform a contact-less Near Field Communication in a radio-frequency field of other devices, the coil 101 of the electronic device 10 is connected to the chip 102 and the rectifier 103 respectively, such that the coil 101 is used for acquiring electricity so as to supply electricity to the rectifier 103 (i.e., the electricity acquisition circuit) and performing communication with the chip 102. The rectifier 103 may output power source which may support for a normal working of the electronic device after performing a rectification on alternating current. Thus, in this embodiment, at the same time when performing Near Field Communication with other devices, the electronic device may also acquire electricity from the coil of the electronic device to support the electronic device to work or to charge the power source built in the electronic device, such that utilization of the electronic device may be improved.

In a technical solution provided by the embodiment of the present disclosure, in order to solve the problem that the electricity acquisition efficiency of the electricity acquisition coil is unable to be improved when the electricity acquisition coil shares the coil with the smart card chip, the radio frequency carrier wave between the coil 101 and the chip 102 must be interrupted effectively. Therefore, in the embodiment, the switcher 104 is added between the coil 101 and the chip 102. The switcher 104 and the chip 102 are connected to a common ground (i.e., both are common grounded), and the coil 101 and the chip 102 may be controlled to be connected or disconnected according to the control signal received. The switcher is configured to switch off a path between the coil 101 and the chip 102 when receiving the control signal indicating that the path between the coil 101 and the chip 102 should be cut off. Therefore, the radio frequency carrier wave between the coil 101 and the chip 102 is interrupted, and all current of the coil may flow into the rectifier without influence of the chip 102, such that the rectifier may acquire electricity at maximum efficiency.

In a technical solution provided by the embodiment of the present disclosure, the electronic device includes but is not limited to the smart card or other electronic devices configured with an NFC function. The electronic device may be configured with display and button input functions and the like, and the smart card may include a security chip configured to achieve electronic signature, signature verification, dynamic password generation and verification functions and the like; the electronic device may communicate with other devices (such as a card reader, a POS machine, an NFC phone, etc.) by wireless communication (radio frequency, NFC, etc.); the chip includes but is not limited to a smart card chip or an interface chip with a contact-less function, in which the interface chip may be connected to CPU, which means that any chip with a contact-less function may be used in this embodiment.

In an alternative technical solution of the embodiment of the present disclosure, the coil 101 may be a radio-frequency coil or an NFC coil and may work at 13.56M; a signal received by the coil 101 includes but is not limited to an NFC signal, a radio-frequency signal and other contact-less signals, while a contact-less way means that communication may be performed without electrical connection. When the electronic device enters the field (i.e., enters a radio-frequency field of another device (such as a card reader, a phone)), the coil 101 may receive the NFC signal and acquire electricity in a contact-less way so as to supply electricity to the rectifier, and the chip may perform an NFC communication with other devices.

Figure 3:
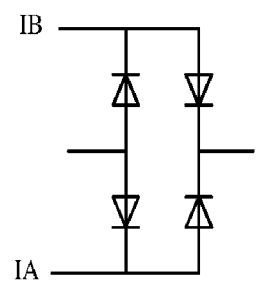
FIG. 3 is a schematic diagram of a rectifier in the electronic device according to Embodiment 1 of the present disclosure.

In the embodiment, the rectifier may be a bridge circuit. In an alternative implementation, the rectifier is a bridge circuit as shown in FIG. 3, as long as a "bridge" structure configured with two diodes is added, a full-wave rectifier may be formed. A first terminal IB of the diode bridge rectifier is connected to the first input terminal of the coil, and a second terminal IA of the diode bridge rectifier is connected to the second input terminal of the coil.

In an alternative implementation of the embodiment of the present disclosure, the sixth terminal of the switcher 104 is connected to a control terminal of the chip 102 (indicated by solid line in FIG. 2), so as to receive the control signal sent by the chip 102. In the embodiment, the chip 102 may be configured to send the control signal to the switcher 104, so as to control the switcher 104 to transfer to the ON state or the OFF state. In the alternative implementation, the chip 102 may be a smart card chip integrated with a MCU (indicated by dashed line in FIG. 2), or may be an interface chip with a contact-less function (not shown in FIG. 2), in which the interface chip may be connected to a CPU, and the CPU may send the control signal to the switcher 104 via the interface chip. Therefore, the ON state and the OFF state of the switcher 104 may be controlled by the chip 102.

In an alternative implementation of the embodiment of the present disclosure, the electronic device of the embodiment further includes: a microcontroller unit MCU 105 (indicated by dashed line in FIG. 2) connected to the chip 102. The sixth terminal of the switcher 104 is connected to a control terminal of the MCU 105, so as to receive the control signal sent by the MCU 105. Therefore, the ON state and the OFF state of the switcher 104 may be controlled by the MCU 105.

In a technical solution provided by the embodiment of the present disclosure, the switcher is configured to receive an operating voltage Vcc by default and to be connected to a common ground together with the chip 102, such that the coil 101 and the chip 102 are connected all the time. In an alternative implementation of the embodiment of the present disclosure, the switcher 104 is configured to be controlled to transfer to an ON state or an OFF state; when the switcher 104 receives a control signal representing disconnecting, the switcher 104 may transfer to the OFF state, so as to control the coil 101 and the chip 102 to be disconnected. When the switcher 104 receives the control signal representing connecting again, since the switcher receives the operating voltage Vcc, the switcher 104 transfers to the ON state, so as to control the coil 101 and the chip 102 to be connected.

In the embodiment, if the rectifier shares the coil with the chip, when the coil 101 and the chip 102 are connected, communication and electricity acquisition may be performed at the same time. When the coil 101 and the chip 102 are disconnected, since the chip 102 does not consume electricity any more, the switcher 104 may receive electricity to maximum extent, such that the electricity acquisition efficiency of the rectifier may be improved.

Additionally, in general, the chip may work at a certain power or voltage. Once the power exceeds a rated power or the voltage of the chip exceeds a rated voltage thereof, elements of the chip may be damaged or unable to work normally. Thus, the chip may limit the voltage thereof to maintain working requirements. In the embodiment, when the chip is connected to the coil, an output voltage of the coil is required to be limited. When the chip shares the coil with the rectifier, the voltage received by the rectifier may decrease, which means that electricity acquisition efficiency of the rectifier may be decreased and thus the power supply efficiency is also decreased. By using the switcher provided in the present disclosure, a path between the coil and the chip may be switched off when the chip is not working, such that the output voltage of the coil may be not affected, and the rectifier may receive maximum voltage of a field of the card reader, thus improving an utilization efficiency of the field energy of the card reader.

Figure 4:
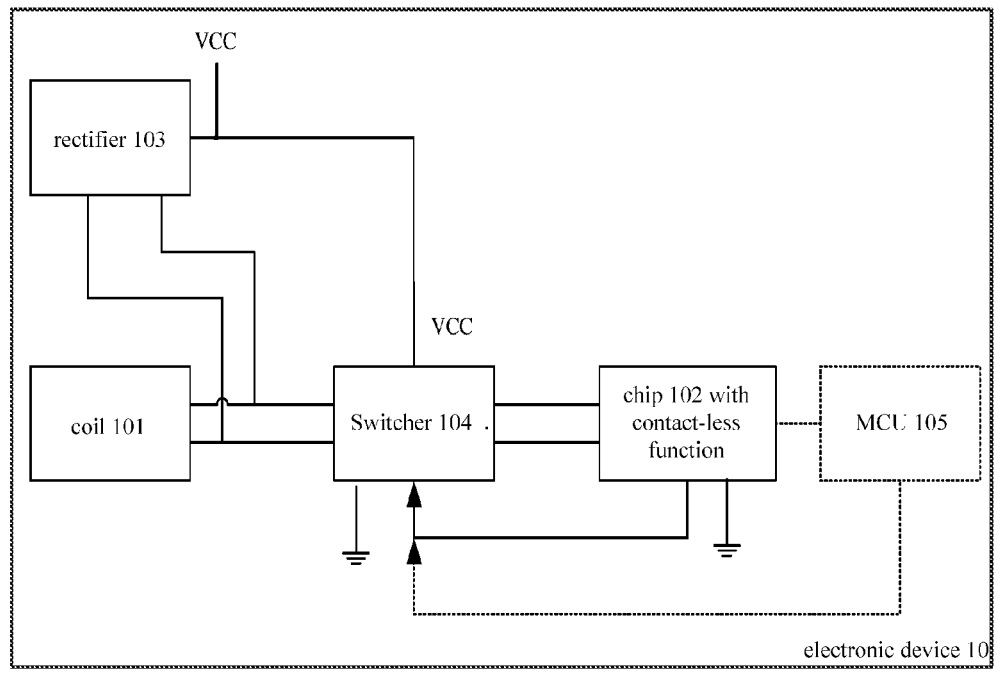
FIG. 4 is another structure diagram of the electronic device according to Embodiment 1 of the present disclosure.

In an alternative implementation of the present disclosure, as shown in FIG. 4, the fifth terminal of the switcher 104 is configured to connect to an output terminal of the rectifier 103, in which the output terminal of the rectifier 103 is configured to output the operating voltage Vcc to the switcher 104. When the electronic device enters the radio-frequency field of another device, since the coil 101 generates alternating current, while the voltage of alternating current may change depending on field intensity generated by the coil 101, the operating voltage provided for the switcher 104 is the output voltage output by the rectifier inside of the electronic device after the fifth terminal of the switcher is connected to the output terminal of the rectifier 103. Thus, the switcher maintains in the ON state when the operating voltage is received in the initial state, such that the coil 101 is connected to the chip 102. In addition, when the electronic device departs from a field (i.e., departs from a radio-frequency field of another device), the alternating current generated by the coil may decrease step-by-step until no current is generated. At this time, the operating voltage of the switcher is zero, the switcher is in the OFF state, and the coil 101 may be disconnected from the chip 102 automatically, which may ensure that the radio-frequency carrier wave between the coil 101 and the chip 102 may be switched off when the electronic device departs from the field.

In the embodiment, if the rectifier shares the coil 101 with the chip 102, when the coil 101 is connected to the chip 102, communication and electricity acquisition are performed at the same time, and when the coil 101 is disconnected from the chip 102, electricity acquisition efficiency of the rectifier may be improved.

Embodiment 2

Figure 5:
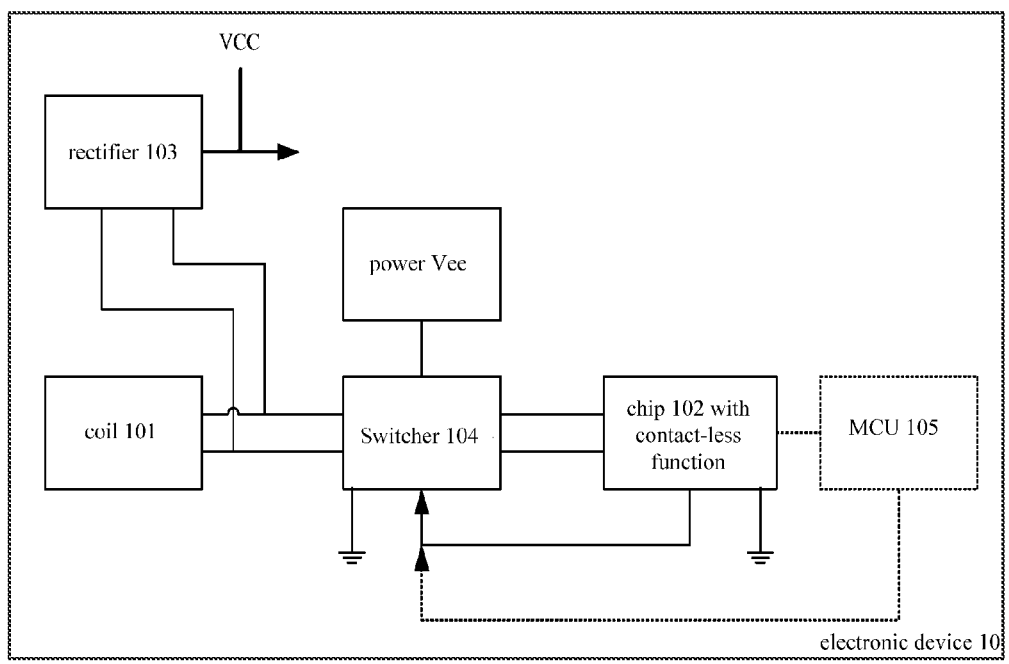
FIG. 5 is a structure diagram of the electronic device according to Embodiment 2 of the present disclosure.

As shown in FIG. 5, the embodiment provides an electronic device. A difference between this embodiment and Embodiment 1 is that, the fifth terminal of the switcher 104 is connected to an external power source in this embodiment, rather than to an output terminal of the rectifier 103, in which the external power source is configured to supply an operating voltage Vee for the switcher.

In an alternative implementation of the embodiment, the operating voltage Vee of the external power source needs to satisfy a preset condition.

In an alternative implementation of the embodiment, for example, the switcher includes an NMOS transistor. The operating voltage Vee provided by the external power source for the switcher is greater than or equal to an output voltage VCC output via an output terminal of the rectifier 103. As an alternative way, when the operating voltage Vee provided by the external power source is greater than a sum of the output voltage output via an output terminal of the rectifier 103 and 0.7V, a best effect may be achieved.

The best realization way for VCC is an external rectifying level, which means that VCC is equal to a maximum level between the two terminals of the coil minus a diode drop. If the external voltage is smaller than the external rectifying level, when the coil is connected to the chip, the maximum operating voltage Vee received by the switcher is VCC minus a starting voltage of the MOS transistor. Thus, when the external power source is connected, the best operating voltage Vee is greater than or equal to a rectifying voltage VCC. When the voltage is smaller than the rectifying voltage VCC, energy may be lost upon conducting, and an operating distance of an IC card may be limited by the external voltage.

Of course, the switcher may include a PMOS transistor. The operating voltage Vee supplied by the external power source for the switcher and the output voltage output via the output terminal of the rectifier may be set according to a conduction condition of the PMOS transistor, which is not described herein.

By the technical solution provided by the embodiment of the present disclosure, when the operating voltage of the external power source satisfies the preset condition, it may be ensured that the switcher is in the ON state whatever the electronic device enters or departs from the field, such that the coil 101 is connected to the chip 102.

Embodiment 3

The embodiment of the present disclosure provides an electronic device.

FIG. 2 is a structure diagram of an electronic device 10 according to the embodiment of the present disclosure. As shown in FIG. 2, the electronic device 10 according to the embodiment of the present disclosure includes: a coil 101, a chip 102 with a contact-less function, a rectifier 103 and a switcher 104; the switcher 104 is connected between the coil 101 and the chip 102, a first output terminal of the coil 101 is electrically connected to a first input terminal of the rectifier 103 and is electrically connected to a second input terminal of the chip 102 via the switcher, in which the coil 101 is configured to sense a field and to output an AC signal via the first output terminal; the rectifier 103 is configured to receive the AC signal input by the coil 101 via the first input terminal, and to output electric power or supply power via a second output terminal of the rectifier 103; and the switcher 104 is configured to connect the coil 101 and the chip 102 under an operating voltage, and when a control signal is received, the switcher is configured to control connection and disconnection of the coil 101 and the chip 102 according to the control signal.

In the electronic device 10 provided by the embodiment of the present disclosure, field energy induced by the coil may be used effectively by means of the rectifier 103, when there is no data communication in the chip 102, the coil 101 may be disconnected from the chip 102 by the switcher 104, which may increase electric power output by the rectifier 103.

In an alternative implementation of the embodiment of the present disclosure, for example, the switcher may include an NMOS transistor. The operating voltage of the switcher 104 is greater than or equal to an output voltage of the rectifier 103. In the implementation, a battery may be provided in the electronic device 10 and the battery may supply the operating voltage to the switcher 104, which is flexible to implement. Preferably, a difference between the operating voltage and the output voltage of the rectifier 103 is greater than or equal to a preset value. Preferably, the preset value is a voltage drop (greater than 0V) induced by the rectifier 103, for example, the voltage drop may be 0.7V. Therefore, it may be ensured that the switcher 104 may conduct a connection between the coil 101 and the chip 102. Of course, the switcher may also include a PMOS transistor, and a condition to be satisfied by the operating voltage and the output voltage output via the output terminal of the rectifier may be set according to the conduction condition of the PMOS transistor, which is not described herein.

In an alternative implementation of the embodiment of the present disclosure, the rectifier 103 is electrically connected to the switcher 104, so as to supply the operating voltage to the switcher 104. By the alternative implementation, the voltage output by the rectifier 103 may supply the operating voltage to the switcher 104, and energy may be used effectively.

In an alternative implementation of the embodiment of the present disclosure, the switcher 104 is electrically connected to a control terminal of the chip 102, so as to receive a control signal output via the output terminal of the chip 102. By the alternative implementation, the chip 102 may send the control signal without adding a controller, which is cost saving.

In an alternative implementation of the embodiment of the present disclosure, the electronic device 10 can further include: a microcontroller unit MCU 105, in which the switcher 104 is electrically connected to a control terminal of the MCU 105 so as to receive the control signal output from the control terminal of the MCU 105. In the alternative implementation, the MCU 105 sends the control signal, which is convenient to control.

In an alternative implementation of the embodiment of the present disclosure, the electronic device 10 can further include: an electric component, in which the second output terminal of the rectifier 103 is electrically connected to the electric component and is configured to provide the electric power to the electric component. In the alternative implementation, the electric power output by the rectifier 103 is used for supplying electric power to the electric component, such that the field energy induced by the coil is used effectively.

In an alternative implementation of the embodiment of the present disclosure, the electronic device 10 can further include: a rechargeable battery, in which the rectifier 103 is electrically connected to the rechargeable battery and is configured to provide the electric power to the rechargeable battery. In the alternative implementation, the electric power output by the rectifier 103 is used for charging the rechargeable battery. The electric power may be supplied to the chip 102 by the rechargeable battery continuously after the chip 102 departs from the card reader, such that functions of the smart card may be enriched and field energy may be used effectively.

In an alternative implementation of the embodiment of the present disclosure, the electronic device 10 may further include: a charging circuit connected between the rectifier 103 and the rechargeable battery, in which the charging circuit is controlled to charge the rechargeable battery. In the alternative implementation, since the charging circuit is controlled to charge the rechargeable battery, the rechargeable battery may be charged when the chip 102 is not used, which may increase charging efficiency in the case that a communication effect of the chip 102 is ensured.

In an alternative implementation of the embodiment of the present disclosure, in the alternative implementation, the switcher 140 may include: an AC input terminal, a third output terminal, a control module, a first ON/OFF circuit and a second ON/OFF circuit, in which the first ON/OFF circuit is provided to couple a first end of the AC input terminal and a first end of the third output terminal, and is configured to be controlled to transfer to an ON state or an OFF state, in which a first path between the first end of the AC input terminal and the first end of the third output terminal is switched on and a second path between the first end of the AC input terminal and the first end of the third output terminal is switched off when the first ON/OFF circuit is in the ON state, the first path between the first end of the AC input terminal and the first end of the third output terminal is switched off and the second path between the first end of the AC input terminal and the first end of the third output terminal is switched on when the first ON/OFF circuit is in the OFF state, the first path and the second path are in opposite flow directions, and the first path is a path from the first end of the AC input terminal to the first end of the third output terminal or a path from the first end of the third output terminal to the first end of the AC input terminal; the second ON/OFF circuit is provided to couple a second end of the AC input terminal and a second end of the third output terminal, and is configured to be controlled to transfer to the ON state or the OFF state, in which a third path between the second end of the AC input terminal and the second end of the third output terminal is switched on and a fourth path between the second end of the AC input terminal and the second end of the third output terminal is switched off when the second ON/OFF circuit is in the ON state, the third path between the second end of the AC input terminal and the second end of the third output terminal is switched off and the fourth path between the second end of the AC input terminal and the second end of the third output terminal is switched on when the second ON/OFF circuit is in the OFF state, the third path and the fourth path are in opposite flow directions, and the third path is a path from the second end of the AC input terminal to the second end of the third output terminal or a path from the second end of the third output terminal to the second end of the AC input terminal; and the control module is provided to couple the operating voltage of the switcher and the common ground, and is configured to be controlled to transfer to the ON state or the OFF state, in which the control module is configured to control the first ON/OFF circuit and the second ON/OFF circuit to transfer to the OFF state when the control module is in the ON state, and to control either one of the first ON/OFF circuit and the second ON/OFF circuit to transfer to the ON state by cooperating with the AC input terminal when the control module is in the OFF state.

When a direction of the first path or the second path of the first ON/OFF circuit is opposite to that of the third path or the fourth path of the second ON/OFF circuit, a loop between the AC input terminal and the third output terminal may be formed, such that signals may be able to be transmitted between the AC input terminal and the third output terminal.

Thus, the voltage between the AC input terminal and the third output terminal may be guaranteed under the control by means of the switcher 104 provided by the embodiment of the present disclosure.

As an alternative implementation of the embodiment of the present disclosure, the first ON/OFF circuit includes a first controllable switch and a first freewheeling conduction element, in which the first controllable switch includes: a first connecting end, a second connecting end and a control end, in which the first freewheeling conduction element is connected between the first connecting end of the first controllable switch and the second connecting end of the first controllable switch, and a conducting direction of the first freewheeling conduction element is opposite to that of the first controllable switch; and the first connecting end of the first controllable switch is configured to be connected to the first end of the AC input terminal, the second connecting end of the first controllable switch is configured to be connected to the first end of the third output terminal, the control end of the first controllable switch is configured to receive the control signal from the control module and to switch on the first path and switch off the second path, or to switch on the second path and switch off the first path.

As an alternative implementation of the embodiment of the present disclosure, the second ON/OFF circuit includes a second controllable switch and a second freewheeling conduction element, in which the second controllable switch includes: a first connecting end, a second connecting end and a control end, the second freewheeling conduction element is connected between the first connecting end of the second controllable switch and the second connecting end of the second controllable switch, and a conducting direction of the second controllable switch is opposite to that of the second freewheeling conduction element; and the first connecting end of the second controllable switch is configured to be connected to the second end of the AC input terminal, the second connecting end of the second controllable switch is configured to be connected to the second end of the third output terminal, the control end of the second controllable switch is configured to receive the control signal from the control module and to switch on the third path and switch off the fourth path, or to switch on the fourth path and switch off the third path.

As an alternative implementation of the embodiment of the present disclosure, the first ON/OFF circuit may use a controllable switch the same as that of the second ON/OFF circuit, or may use a controllable switch different from that of the second ON/OFF circuit, which means that any controllable switch which may achieve functions of the first ON/OFF circuit and the second ON/OFF circuit in the embodiment of the present disclosure falls into the scope of the present disclosure.

As an alternative implementation of the embodiment of the present disclosure, the first ON/OFF circuit may include a first enhanced MOS transistor (MOSFET), and the second ON/OFF circuit may include a second enhanced MOS transistor (MOSFET). Alternatively, at least one of the first ON/OFF circuit and the second ON/OFF circuit uses an enhanced MOSFET, and a diode is configured in the enhanced MOSFET. An ON/OFF function of a switch may be achieved by using the enhanced MOSFET. Influence on other components cooperating with the switcher may be decreased by taking an advantage of the fact that an equivalent resistance of the enhanced MOSFET is small, also cost may be saved and reliability of the circuit may be improved.

In the embodiment, an N-channel MOSFET or a P-channel MOSFET may be used. For example, each of the first enhanced MOSFET and the second enhanced MOSFET is an N-channel MOSFET, which is described as follows.

As an alternative implementation of the embodiment of the present disclosure, a source electrode of the first enhanced MOSFET is connected to a first end of the AC input terminal, a drain electrode is connected to the first end of the output terminal, and a grid electrode is connected to the control module.

As an alternative implementation of the embodiment of the present disclosure, the first ON/OFF circuit may include a first bias resistor R1 besides the first enhanced MOSFET, a terminal of the first bias resistor R1 is connected to the source electrode of the first enhanced MOSFET, and the other terminal of the first bias resistor R1 is connected to the grid electrode of the first enhanced MOSFET. By setting a bias resistor between the source electrode and the grid electrode of the first enhanced MOSFET, it may be ensured that the first enhanced MOSFET may be cut-off reliably, thereby guaranteeing stability and reliability of the circuit.

As an alternative implementation of the embodiment of the present disclosure, the first ON/OFF circuit may include a first load component besides the first enhanced MOSFET, in which a first terminal of the first load component is connected to a grid electrode and a second terminal of the first load component is connected to the control module. By setting a load component between the first enhanced MOSFET and the control module, stability and reliability of the circuit may be ensured.

As an alternative implementation of the embodiment of the present disclosure, the first load component may be a resistor. When a resistance value of the first bias resistor R1 is great, influence on the AC input terminal is small, the first load component may be the resistor to ensure stability of the circuit.

As an alternative implementation of the embodiment of the present disclosure, the first load component may be a first unidirectional conduction element. An output terminal of the first unidirectional conduction element used as a first terminal of the first load component is connected to the grid electrode of the first enhanced MOSFET, and an input terminal of the first unidirectional conduction element used as a second terminal of the first load component is connected to the control module. When a resistance value of the first bias resistor R1 is small, influence on the AC input terminal is great, the first load component may be a unidirectional conduction element to avoid influence of the circuit on the AC input terminal and to improve stability and reliability of the circuit.

As an alternative implementation of the embodiment of the present disclosure, the first unidirectional conduction element may include a diode or a triode and other elements with the unidirectional conduction function.

Of course, as an alternative implementation of the embodiment of the present disclosure, the first ON/OFF circuit may also use a P-channel MOSFET, and a connecting relationship may be modified adaptively according to features of the MOSFET.

As an alternative implementation of the embodiment of the present disclosure, a source electrode of the second enhanced MOSFET is connected to a second end of the AC input terminal, a drain electrode is connected to the second end of the output terminal, and a grid electrode is connected to the control module.

As an alternative implementation of the embodiment of the present disclosure, the second ON/OFF circuit may include a second bias resistor R2 besides the second enhanced MOSFET, a terminal of the second bias resistor R2 is connected to the source electrode of the second enhanced MOSFET, and the other terminal of the second bias resistor R2 is connected to the grid electrode of the second enhanced MOSFET. By setting a bias resistor between the source electrode and the grid electrode of the second enhanced MOSFET, it may be ensured that the second enhanced MOSFET may be cut-off reliably, thereby guaranteeing stability and reliability of the circuit.

As an alternative implementation of the embodiment of the present disclosure, the second ON/OFF circuit may include a second load component besides the second enhanced MOSFET, in which a first terminal of the second load component is connected to a grid electrode and a second terminal of the second load component is connected to the control module. By setting a load component between the second enhanced MOSFET and the control module, stability and reliability of the circuit may be ensured.

As an alternative implementation of the embodiment of the present disclosure, the second load component may be a resistor. When a resistance value of the second bias resistor R2 is great, influence on the AC input terminal is small, the second load component may be the resistor to ensure stability of the circuit.

As an alternative implementation of the embodiment of the present disclosure, the second load component may be a second unidirectional conduction element. An output terminal of the second unidirectional conduction element used as a first terminal of the second load component is connected to the grid electrode of the second enhanced MOSFET, and an input terminal of the second unidirectional conduction element used as a second terminal of the second load component is connected to the control module. When a resistance value of the second bias resistor R2 is small, influence on the AC input terminal is great, the second load component may be a unidirectional conduction element to avoid influence of the circuit on the AC input terminal and to improve stability and reliability of the circuit.

As an alternative implementation of the embodiment of the present disclosure, the second unidirectional conduction element may include a diode or a triode and other elements with the unidirectional conduction function.

Of course, as an alternative implementation of the embodiment of the present disclosure, the second ON/OFF circuit may also use a P-channel MOSFET, and a connecting relationship may be modified adaptively according to features of the MOSFET.

As another alternative implementation of the embodiment of the present disclosure, the first ON/OFF circuit includes a first controllable switch and a first freewheeling conduction element, and the second ON/OFF circuit includes a second controllable switch and a second freewheeling conduction element.

As an alternative implementation of the embodiment of the present disclosure, when the first ON/OFF circuit includes the first controllable switch, the first controllable switch may include a first MOSFET. In this case, the first controllable switch may further include a first bias resistor. As an alternative implementation of the embodiment of the present disclosure, the first MOSFET may be an N-channel MOSFET, in which a source electrode configured as the first connecting end of the first controllable switch is connected to a first end of the AC input terminal, a drain electrode configured as the second connecting end of the first controllable switch is connected to a first end of the output terminal, a grid electrode is configured as the control end of the first controllable switch, a terminal of the first bias resistor is connected to the source electrode of the first MOSFET, and the other terminal of the first bias resistor is connected to the grid electrode of the first MOSFET. As an alternative implementation of the embodiment of the present disclosure, in order to ensure stability of the circuit, the first controllable switch may include a third load component besides the first MOSFET and the first bias resistor, in which the grid electrode of the first MOSFET is connected to the control module via the third load component. Of course, the first controllable switch may further include a P-channel MOSFET, and a connecting relationship may be modified adaptively according to features of the MOSFET.

As an alternative implementation of the embodiment of the present disclosure, the third load component may be a resistor or a third unidirectional conduction element, and the third unidirectional conduction element may include a diode or a triode and other elements with the unidirectional conduction function.

As an alternative implementation of the embodiment of the present disclosure, the first MOSFET (including a first N-channel MOSFET and a first P-channel MOSFET) may be a junction field-effect transistor (JFET).

As an alternative implementation of the embodiment of the present disclosure, when the second ON/OFF circuit includes the second controllable switch, the second controllable switch may include a second MOSFET. In this case, the second controllable switch may further include a second bias resistor. As an alternative implementation of the embodiment of the present disclosure, the second MOSFET may be an N-channel MOSFET, in which a source electrode configured as the first connecting end of the second controllable switch is connected to a second end of the AC input terminal, a drain electrode configured as the second connecting end of the second controllable switch is connected to a second end of the output terminal, a grid electrode is configured as the control end of the second controllable switch, a terminal of the second bias resistor is connected to the source electrode of the second MOSFET, and the other terminal of the second bias resistor is connected to the grid electrode of the second MOSFET. As an alternative implementation of the embodiment of the present disclosure, in order to ensure stability of the circuit, the second controllable switch may include a fourth load component besides the second MOSFET and the second bias resistor, in which the grid electrode of the second MOSFET is connected to the control module via the fourth load component. Of course, the second controllable switch may also include a P-channel MOSFET, and a connecting relationship may be modified adaptively according to features of the MOSFET.

As an alternative implementation of the embodiment of the present disclosure, the fourth load component may be a resistor or a fourth unidirectional conduction element, in which the fourth unidirectional conduction element may include a diode or a triode and other elements with the unidirectional conduction function.

As an alternative implementation of the embodiment of the present disclosure, the second MOSFET (including a second N-channel MOSFET and a second P-channel MOSFET) may be a junction field-effect transistor (JFET).

As an alternative implementation of the embodiment of the present disclosure, the first controllable switch may include a P-channel MOSFET, and the second controllable switch may also include a P-channel MOSFET. Of course, the first controllable switch and the second controllable switch may include different kinds of MOSFETs, for example, the first controllable switch may include an N-channel MOSFET, and the second controllable switch may include a P-channel MOSFET, etc. Any controllable switch which may achieve functions of the first controllable switch and the second controllable switch in the embodiment of the present disclosure falls into the scope of the present disclosure.

As an alternative implementation of the embodiment of the present disclosure, the control module may be the controllable switch, in which the controllable switch may include: a first connecting end, a second connecting end and a control end. The first connecting end is configured to be connected to the operating voltage, the second connecting end is configured to be connected to common ground, and the control end is configured to receive the control signal from outside and to switch on or switch off according to the control signal. At the same time, the first connecting end is also configured to be connected to the first ON/OFF circuit and the second ON/OFF circuit respectively. The first ON/OFF circuit and the second ON/OFF circuit are controlled to transfer to the OFF state when the control module is in the ON state. One of the first ON/OFF circuit and the second ON/OFF circuit is controlled to transfer to the ON state by cooperating with the AC input terminal when the control module is in the OFF state.

As an alternative implementation of the embodiment of the present disclosure, when the control module is a controllable switch, the control module may include a MOSFET. In this case, the controllable switch may also include a third bias resistor R3 to cooperate with the circuit to determine a reasonable load component. As an alternative implementation of the embodiment of the present disclosure, the MOSFET may be an N-channel MOSFET, in which a drain electrode configured as the first connecting end of the controllable switch is connected to an operating voltage via the third bias resistor R3, which means that the drain electrode is connected to a terminal of the third bias resistor R3, and the other terminal of the third bias resistor R3 is connected to the operating voltage, and a source electrode configured as a second connecting end of the controllable switch is connected to a common ground, and a grid electrode is configured as the control end of the controllable switch to receive the control signal from outside. Of course, the control module may also include a P-channel MOSFET, and a connecting relationship may be modified adaptively according to features of the MOSFET.

Embodiment 4

An electronic device is provided according to the embodiment of the present disclosure.

The electronic device according to the embodiment of the present disclosure includes: a coil and a chip with a contactless function, and the electronic device also includes: a rectifier; an output terminal of the coil is electrically connected to an input terminal of the rectifier and the input terminal of the chip respectively, in which the coil is configured to generate and output an AC signal via the output terminal; the rectifier is configured to receive the AC signal input by the coil via the input terminal of the rectifier, and to output electric power or supply electric power via the output terminal of the rectifier;

By the electronic device provided by the embodiment, the AC signal generated by the coil is output as electric power, which may improve an effective usage of field energy.

In a technical solution provided by the embodiment of the present disclosure, the electronic device includes but is not limited to the smart card or other electronic devices configured with NFC function. The chip includes but is not limited to a smart card chip or an interface chip with a contact-less function, in which the interface chip may be connected to the CPU. In an alternative technical solution of the embodiment of the present disclosure, a signal received by the coil 101 includes but is not limited to an NFC signal, a radio-frequency signal and other contact-less signals, while a connectionless way is a contact-less way, which means that communication may be performed without electrical connection. When the electronic device enters the field (i.e., enters a radio-frequency field of another device (such as a card reader, a phone)), the coil may receive the NFC signal in the connectionless way, and the chip may perform an NFC communication with other devices.

In an alternative technical solution of the embodiment of the present disclosure, the electronic device may also include: a switcher connected between the coil and the chip, in which the switcher is configured to connect the coil and the chip under an operating voltage, and when a control signal is received, the switcher is configured to control connection and disconnection of the coil and the chip according to the control signal. In this alternative technical solution, when there is no data communication with the chip, the connection between the coil and the chip is switched off by the switcher and the electric power output by the rectifier is increased. Specific structure of the switcher is shown in embodiment 8 and FIG. 8 and FIG. 9. In an alternative embodiment, the switcher may include a MOSFET in FIG. 9.

In an alternative technical solution of the embodiment of the present disclosure, take the switcher being implemented with an N-channel MOSFET as an example, the operating voltage is greater than or equal to an output voltage of the rectifier. By this alternative technical solution, the operating voltage may be provided by a battery to the switcher, which is flexible. In an alternative technical solution of the embodiment of the present disclosure, a difference between the operating voltage and the output voltage of the rectifier is greater than or equal to a preset value. Preferably, the preset value may be a voltage drop (greater than zero and may be, for example, 0.7V) generated by the rectifier. By this alternative technical solution, it may be ensured to maximum extent that the connection between the coil and the chip may be switched on by the switcher. Of course, the switcher may include a P-channel MOSFET, and a condition that the operating voltage and the voltage output via the output terminal of the rectifier should satisfy may be set depending on a conduction condition of the P-channel MOSFET, which is not described herein.

In an alternative technical solution of the embodiment of the present disclosure, the rectifier is electrically connected to the switcher and is configured to supply the operating voltage to the switcher. By this alternative technical solution, electric power output by the rectifier is provided as the operating voltage to the switcher, such that the energy may be used effectively.

In an alternative technical solution of the embodiment of the present disclosure, the switcher is electrically connected to a control terminal of the chip and is configured to receive the control signal output via the control terminal of the chip. By the electronic device provided by the alternative technical solution, the control signal is sent by the chip without an additional controller.

In an alternative technical solution of the embodiment of the present disclosure, the electronic device may further include: a microcontroller unit MCU, in which a switcher is electrically connected to a control terminal of the MCU and is configured to receive the control signal output via the control terminal of the MCU. By the electronic device provided by the alternative technical solution, the control signal is sent by the MCU, which is convenient to control.

In an alternative technical solution of the embodiment of the present disclosure, the output terminal of the coil includes a first output port and a second output port, the input terminal of the chip includes: a first input port and a second input port, and the switcher includes: a first port, a second port, a third port, a fourth port, a fifth port and a sixth port, in which the first port of the switcher is electrically connected to the first output port of the coil, the second port of the switcher is connected to the second output port of the coil, the third port of the switcher is connected to the first input port of the chip, the fourth port of the switcher is connected to the second input port of the chip, the operating voltage of the switcher is input via the fifth port of the switcher, and the control signal is output via the sixth port of the switcher.

In an alternative technical solution of the embodiment of the present disclosure, the electronic device may further include: an electric component, in which the rectifier is electrically connected to the electric component and is configured to provide the electric power to the electric component. In this alternative technical solution, electric power output by the rectifier is used for supplying electric power to the electric component, which makes a usage of the field energy effectively.

In an alternative technical solution of the embodiment of the present disclosure, the electronic device may further include: a rechargeable battery, in which the output terminal of the rectifier is electrically connected to the rechargeable battery and is configured to provide the electric power to the rechargeable battery. In this alternative technical solution, electric power output by the rectifier is used for charging the rechargeable battery, and by using the rechargeable battery, the chip may be supplied with electric power continuously after the chip departs from the card reader, which may enrich functions of the smart card and make a usage of the field energy effectively.

In an alternative technical solution of the embodiment of the present disclosure, the electronic device may further include: a charging circuit connected between the rectifier and the rechargeable battery, in which the charging circuit is controlled to charge the rechargeable battery. By this alternative technical solution, since the charging circuit is controlled to charge the rechargeable battery, the rechargeable battery may be charged when the chip is not used, which may improve charging efficiency in the case that communication effect of the chip is ensured.

Embodiment 5

Figure 6:
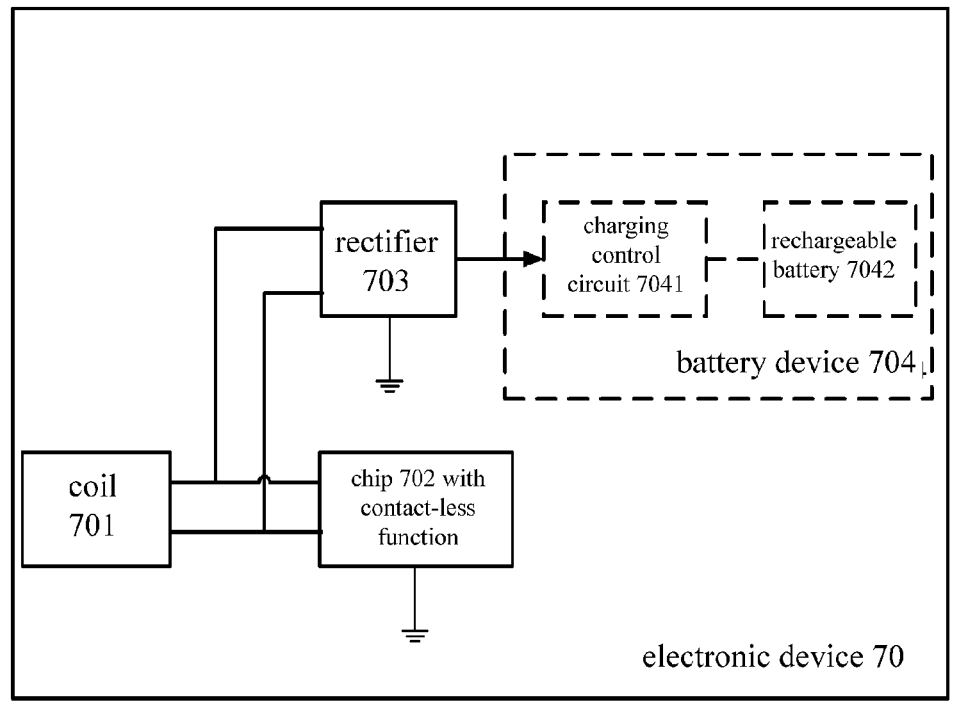
FIG. 6 is a structure diagram of the electronic device according to Embodiment 5 of the present disclosure.

The embodiment of the present disclosure provides an electronic device 70, as shown in FIG. 6, the electronic device 70 includes: a coil 701, a chip 702 with a contact-less function, and a rectifier 703; in a specific implementation, the electronic device may be a smart card configured with display and button input functions and the like, and the smart card may include safety chip configured to achieve electronic signature, signature verification, dynamic password generation and verification functions and the like; the smart card may communicate with a reader-writer (such as a POS machine, an NFC phone, etc.) by wireless communication (radio frequency, NFC, etc.).

In an alternative technical solution of the embodiment of the present disclosure, the coil 701 may be a radio-frequency coil or an NFC coil, etc., and the electronic device 70 may be connected to the coil of the reader-writer by means of the coil 701, so as to communicate with the reader-writer or to supply electric power to the electronic device 70; the smart card may work at 13.56 MHz and the coil may be a coil in conformity with frequencies specified by 1443 protocol; a signal received by the coil 701 includes but is not limited to an NFC signal, a radio-frequency signal and other contact-less signals, while a connectionless way is a contact-less way, which means that communication may be performed without electrical connection. When the smart card enters the field (i.e., enters a radio-frequency field of another device (such as a card reader, a phone)), the coil may receive the NFC signal and acquire electricity and output electricity to the rectifier in the connectionless way, and the chip may perform an NFC communication with other devices.

In an alternative technical solution of the embodiment of the present disclosure, the chip 702 may be a chip in conformity with 1443 protocol or may be a common IC card chip or a chip including a contact-less interface and a CPU, which means that any chip with a contact-less function is suitable for the present disclosure.

In an alternative technical solution of the embodiment of the present disclosure, the rectifier 703 may include unidirectional conduction elements (like diodes), which may be a bridge circuit jointed by four diodes and configured to rectify electric power output via the coil to output electric power.

A first output terminal of the coil 701 is connected to a first input terminal of the rectifier 703 and a first terminal of the chip 702 respectively, and a second output terminal of the coil 701 is connected to a second input terminal of the rectifier 703 and a second terminal of the chip 702; specifically, the coil 701 is connected to the rectifier 703 and the chip 702 respectively and is configured to output electric power to the rectifier 703 and the chip 702 at the same time.

The electronic device according to the embodiment is configured to acquire electric power via the coil of the electronic device and to transmit electric power to the rectifier and the chip, when the electronic device is connected to the card reader. By supplying electric power to the chip and outputting electric power to the rectifier at the same time, field energy of the coil of the card reader is fully used and waste of electric power may be avoided. In the embodiment, when the rectifier shares the coil with the chip, communication and electricity acquisition may be performed at the same time when the coil and the chip are connected, and electricity acquisition efficiency of the rectifier may be improved when the coil and the chip are disconnected.

Additionally, an output terminal of the rectifier 703 is connected to an apparatus to which electric power is needed to be supplied in the electronic device 70. In a specific implementation, the output terminal of the rectifier 703 is connected to other apparatuses (such as a display, a button, a security chip, etc.) to which electric power is needed to be supplied of the electronic device 70, such that other apparatuses of the electronic device may work regularly without electric power supply, which saves energy. The rectifier may include a diode bridge rectifier as shown in FIG. 3, and concerning a description of the diode bridge rectifier, reference may be made to the description of FIG. 3. A rectifier is also configured inside of the chip, the rectifier may include a diode bridge rectifier similar to FIG. 3, in which an IA terminal of the diode bridge rectifier is connected to a first input terminal A of the coil, an IB terminal of the diode bridge rectifier is connected to a second input terminal B of the coil, an IC terminal of the diode bridge rectifier is a power supplying terminal VCC, and an ID terminal of the diode bridge rectifier is grounded, in which a filtering capacitor which is configured to filter is connected between the power supplying terminal VCC and the ground.

Additionally, the electronic device 70 further includes: a battery apparatus 704; a terminal of the battery apparatus 704 is connected to an output terminal of the rectifier 703. In a specific implementation, the electronic device further includes the battery apparatus 704 in order to make a full usage of electric power, in which electric power output by the rectifier 703 may be used for charging the battery apparatus.

Additionally, the battery apparatus 704 further includes a charging control circuit 7041 and a rechargeable battery 7042. The coil 701 is configured to charge the rechargeable battery 7042 when the charging control circuit 7041 is turned on. In a specific implementation, the charging control circuit is configured to control whether to charge the rechargeable battery. For example, the charging control circuit may be a switch configured to control whether to charge the rechargeable battery by controlling the switch to be switched on or off. When the rechargeable battery 7042 is needed to be charged, the switch is switched on, and when it is unnecessary to charge the rechargeable battery 7042, the switch is switched off.

Additionally, another terminal of the battery apparatus 704 is connected to the power supplying terminal of the chip 702. Specifically, the battery apparatus 704 may be also connected to the chip 702, and electric power is supplied to the chip 702 by the battery apparatus 704 without configuring a battery for the chip 702, such that the chip 702 may work when the path between the chip 702 and the coil is cut off.

Embodiment 6

An electronic device is provided according to the embodiment of the present disclosure.

The electronic device according to the embodiment of the present disclosure mainly includes: a coil and a chip with a contact-less function, and the electronic device further includes: a switcher connected between the coil and the chip, in which the coil is configured to generate an AC signal and output the AC signal via an output terminal thereof; the switcher is configured to connect the output terminal of the coil to the input terminal of the chip under an operating voltage, and when a control signal is received, the switcher is configured to control connection and disconnection of the coil and the chip according to a control signal.

According to the electronic device provided by the embodiment, a connection between the coil and the chip may be switched off by the switcher, such that the field energy may be fully used when the chip does not perform a communication.

In a technical solution provided by the embodiment of the present disclosure, the electronic device includes but is not limited to the smart card or other electronic devices configured with NFC function. The chip includes but is not limited to a smart card chip or an interface chip with a contact-less function, in which the interface chip may be connected to the CPU. In an alternative technical solution of the embodiment of the present disclosure, a signal received by the coil 101 includes but is not limited to an NFC signal, a radio-frequency signal and other contact-less signals, while a connectionless way is a contact-less way, which means that communication may be performed without electrical connection. When the electronic device enters the field (i.e., enters a radio-frequency field of another device (such as a card reader, a phone)), the coil may receive the NFC signal in the connectionless way and the chip may perform an NFC communication with other devices.

In a technical solution provided by the embodiment of the present disclosure, the switcher is electrically connected to a control terminal of the chip and is configured to receive the control signal output via the control terminal of the chip. Specific structure of the switcher is shown in embodiment 8 and FIG. 8 and FIG. 9. In an alternative embodiment, the switcher may include a MOSFET in FIG. 9. By the alternative implementation, the control signal is sent by the chip without an additional controller, which saves the cost.

In an alternative technical solution of the embodiment of the present disclosure, the electronic device may further include: a microcontroller unit MCU, in which a switcher is electrically connected to a control terminal of the MCU and is configured to receive the control signal output via the control terminal of the MCU. By the electronic device provided by the alternative technical solution, the control signal is sent by the MCU, which is convenient to control.

In an alternative technical solution of the embodiment of the present disclosure, the output terminal of the coil includes a first output port and a second output port, the input terminal of the chip includes: a first input port and a second input port, and the switcher includes: a first port, a second port, a third port, a fourth port, a fifth port and a sixth port, in which the first port of the switcher is electrically connected to the first output port of the coil, the second port of the switcher is connected to the second output port of the coil, the third port of the switcher is connected to the first input port of the chip, the fourth port of the switcher is connected to the second input port of the chip, the operating voltage of the switcher is input via the fifth port of the switcher, and the control signal is output via the sixth port of the switcher.

In an alternative embodiment of the present disclosure, the electronic device may further include: a rectifier; an input terminal of the rectifier is electrically connected to an output terminal of the coil, in which the rectifier is configured to receive the AC signal input by the coil via the input terminal of the rectifier, and to output electric power via the output terminal of the rectifier. By the alternative implementation, the electronic device may output electric power to outside so as to improve effective utilization of the field energy.

In an alternative technical solution of the embodiment of the present disclosure, take the switcher being implemented with an N-channel MOSFET as an example, the operating voltage is greater than or equal to an output voltage of the rectifier. By this alternative technical solution, the operating voltage may be provided by a battery to the switcher, which is flexible. In an alternative technical solution of the embodiment of the present disclosure, a difference between the operating voltage and the output voltage of the rectifier is greater than or equal to a preset value. Preferably, the preset value may be a voltage drop (greater than zero and may be, for example, 0.7V) generated by the rectifier. By this alternative technical solution, it may be ensured to maximum extent that the connection between the coil and the chip may be switched on by the switcher. Of course, the switcher may include a P-channel MOSFET, and a condition that the operating voltage and the voltage output via the output terminal of the rectifier should satisfy may be set depending on a conduction condition of the P-channel MOSFET, which is not described herein.

In an alternative technical solution of the embodiment of the present disclosure, the output terminal of the rectifier is electrically connected to the switcher and is configured to supply the operating voltage to the switcher. By this alternative technical solution, electric power output by the rectifier is used for providing the operating voltage to the switcher, which uses energy effectively.

In an alternative technical solution of the embodiment of the present disclosure, the electronic device may further include: an electric component, in which the rectifier is electrically connected to the electric component and is configured to provide the electric power to the electric component. In this alternative technical solution, electric power output by the rectifier is used for supplying electric power to the electric component, which makes a usage of the field energy generated by the coil effectively.

In an alternative technical solution of the embodiment of the present disclosure, the electronic device may further include: a rechargeable battery, in which the rectifier is electrically connected to the rechargeable battery and is configured to provide the electric power to the rechargeable battery. In this alternative technical solution, electric power output by the rectifier is used for charging the rechargeable battery, and by using the rechargeable battery, the chip may be supplied with electric power continuously after the chip departs from the card reader, which may enrich functions of the smart card and make a usage of the field energy effectively.

In an alternative technical solution of the embodiment of the present disclosure, the electronic device may further include: a charging circuit connected between the rectifier and the rechargeable battery, in which the charging circuit is controlled to charge the rechargeable battery. By this alternative technical solution, since the charging circuit is controlled to charge the rechargeable battery, the rechargeable battery may be charged when the chip is not used, which may improve charging efficiency in the case that communication effect of the chip is ensured.

In an alternative technical solution of the embodiment of the present disclosure, the rechargeable battery is electrically connected to the switcher and is configured to input the operating voltage to the switcher. By the alternative implementation, the operating voltage is provided by the rechargeable battery to the switcher, so as to make a full usage of the field energy generated by the coil.

Embodiment 7

In prior arts, a smart card coil and a smart card chip are connected directly. As long as the smart card enters a field (i.e., is arranged in a radio-frequency field) and connects to a reader-writer, the smart card chip may consume field energy whatever the smart card chip is working and lead to waste of the electric power. In order to make a full use of the field energy generated by a reader-writer, an electricity acquisition circuit is set to acquiring electricity for the smart card. When the electricity acquisition circuit is configured with a separate electricity acquisition circuit, difficulty and cost may be increased and the communication between the chip and the reader-writer may be affected by the electricity acquisition circuit. When the electricity acquisition circuit shares the coil with the smart card, a best electricity acquisition efficiency is unable to be achieved since the smart card chip may share a part of electric power.

Figure 7:
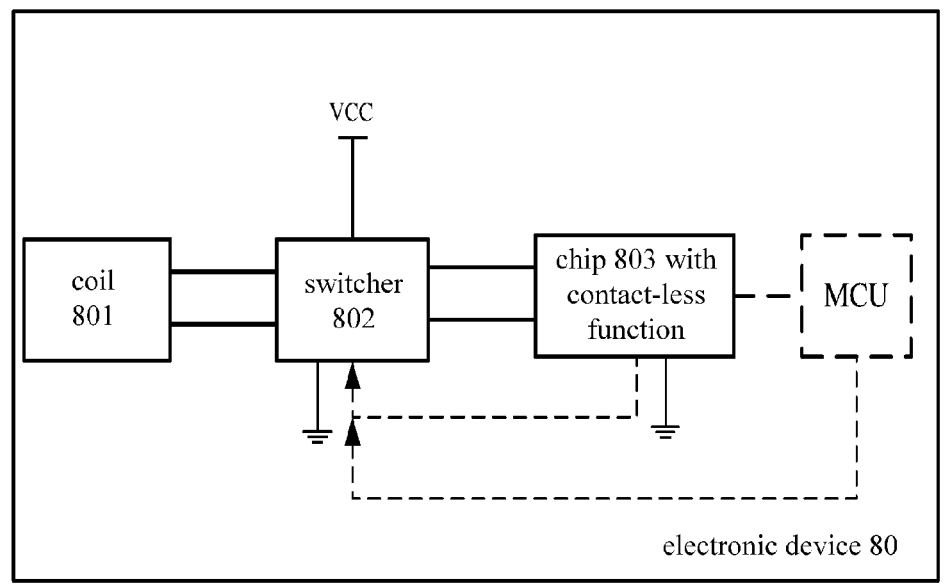
FIG. 7 is a structure diagram of the electronic device according to Embodiment 7 of the present disclosure.

In order to solve the above problems, The embodiment of the present disclosure provides an electronic device 80, as shown in FIG. 7, the electronic device 80 includes: a coil 801, a switcher 802, a chip 803 with a contact-less function; in a specific implementation, the electronic device may be a smart card configured with display and button input functions and the like, and the smart card may include a security chip configured to achieve electronic signature, signature verification, dynamic password generation and verification functions and the like; the smart card may communicate with a reader-writer (such as a POS machine, an NFC phone, etc.) by wireless communication (radio frequency, NFC, etc.); the coil 801 may be a radio-frequency coil or an NFC coil, etc., and the electronic device 80 may be connected to the coil of the reader-writer via the coil 801, so as to communicate with the reader-writer or to supply electric power to the electronic device 80; the smart card chip may work at 13.56 MHz and the coil is a coil in conformity with frequencies specified by 1443 protocol; in an alternative technical solution of the embodiment of the present disclosure, the chip 803 is a chip in conformity with 1443 protocol and may be a chip including a contact-less interface and a CPU, which means any chip with a contact-less function is suitable for the present disclosure. Specific structure of the switcher 802 is shown in embodiment 8 and FIG. 8 and FIG. 9. In an alternative embodiment, the switcher may include a MOSFET in FIG. 9. Since the resistance of the MOSFET is small, even though the MOSFET is connected in series between a resonant circuit of a first input terminal LA and the resonant circuit of a second input terminal LB of the chip of the electronic device (the smart card) when the MOSFET is conducted, the communication between the electronic device and the reader-writer or the NFC phone is not affected.

A first output terminal of the coil 801 is connected to a first terminal of the switcher 802, and a second output terminal of the coil 801 is connected to a second terminal of the switcher 802.

A third terminal of the switcher 802 is connected to a first input terminal of the chip 803, a fourth terminal of the switcher 802 is connected to a second input terminal of the chip 803.

A fifth terminal of the switcher 802 is configured to receive an operating voltage and to conduct the coil 801 and the chip 803; a sixth terminal of the switcher 802 is configured to receive a control signal and to control connection and disconnection of the coil 801 and the chip 803 according to the control signal. In a specific implementation, the control signal may be a level signal and is configured to control the connection and disconnection of the coil 801 and the chip 803 according to a change of the level signal.

In an embodiment of the present disclosure, the sixth terminal of the switcher 802 is configured to receive the control signal and to control the connection and disconnection of the coil 801 and the chip 803 according to the control signal, in which the sixth terminal of the switcher 802 is configured to receive the control signal, and to disconnect the coil 801 from the chip 803 when the control signal is a high level signal. Specifically, when the switcher 802 receives the high level signal, one path or two paths between the coil and the chip are controlled by components like the MOSFET etc. in the switcher to be switched off through a transition of electric levels inside of the switcher, such that the connection between the coil and the chip may be disconnected; when the switcher receives a low level signal or no level signal is received, the switcher switches on at least one path between the coil and the chip, such that the connection between the coil and the chip is maintained.

In other embodiments of the present disclosure, the sixth terminal of the switcher 802 is configured to receive the control signal and to control the connection and disconnection of the coil 801 and the chip 803 according to the control signal, in which the sixth terminal of the switcher 802 is configured to receive the control signal, and to disconnect the coil 801 from the chip 803 when the control signal is a low level signal. Specifically, when the switcher 802 receives the low level signal or no level signal is received, one path or two paths between the coil and the chip are controlled by components like the MOSFET etc. in the switcher to be switched off through a transition of levels inside of the switcher, such that the connection between the coil and the chip may be disconnected; when the switcher receives a high level signal, the switcher switches on at least one path between the coil and the chip, such that the connection between the coil and the chip is maintained.

The electronic device according to the embodiment of the present disclosure is configured to acquire electric power via the coil of the electronic device when the electronic device is connected to the card reader, and to transmit electric power to the chip. When electric power is supplied to the chip, the coil and the chip may be controlled by the switcher to be connected or disconnected, which makes a full usage of the field energy of the coil of the card reader and avoids waste of electric power.

Additionally, the switcher of the present disclosure is different from an analog switch. Since the analog switch has a conduction resistance when conducting, and the conduction resistance is connected in series in a resonant circuit between a first input terminal LA and a second input terminal LB of the chip of the electronic device (the smart card), such that a resonant Q factor of the smart card coil is decreased and the communication between the electronic device and the reader-writer or the NFC phone may be affected. However, by using the switcher of the present disclosure, which may be achieved by applying a MOSFET in FIG. 9, since the resistance of the MOSFET is small, even though the MOSFET is connected in the resonant circuit between the first input terminal LA and the second input terminal LB of the chip having the contact-less function of the electronic device (the smart card), the communication between the electronic device and the reader-writer or the NFC phone is not affected. Thus, the usage of the switcher of the present disclosure not only can control the coil and the chip to be connected or disconnected but also can avoid influence caused by the analog switch on communication.

In a specific implementation, the switcher may receive the operating voltage by at least one of following ways:

(1) When the electronic device further includes a rectifier, the coil is also connected to the rectifier. The fifth terminal of the switcher may be connected to the output terminal of the rectifier, and the output terminal of the rectifier outputs the operating voltage. Providing the operating voltage of the switcher by the output terminal of the rectifier, the level change of the output terminal of the rectifier and that of the operating voltage of the switcher are synchronous, which may ensure that the operating voltage of the switcher may not affect the normal work of the chip having the contact-less function and may not affect a working distance of the electronic device.

(2) When the electronic device further includes a battery for supplying electric power to the switcher, the fifth terminal of the switcher is connected to a power supplying terminal of the battery and the operating voltage is supplied by the battery to the switcher; at this time, taking the switcher being implemented with an N-channel MOSFET as an example, the operating voltage of the switcher is greater than or equal to an output voltage at the output terminal of the rectifier (if there is). Specifically, a difference between the operating voltage and the output voltage output from the rectifier is greater than or equal to a preset value. Preferably, the preset value may be a voltage drop (greater than 0 V) induced by the rectifier, the operating voltage of the switcher may be the output voltage at the output terminal of the rectifier (if there is) plus 0.7 V, so as to ensure that the switcher may work normally. Of course, the switcher may also include a PMOS transistor, and a condition which the operating voltage and the output voltage output via the output terminal of the rectifier should satisfy may be set according to a conduction condition of the PMOS transistor, which may be not described herein. When the operating voltage of the switcher is smaller than the output voltage at the output terminal of the rectifier, the switcher may loss energy when conducting, which may cause that a working distance of the electronic device (the smart card) may be limited and the working distance of the smart card may be reduced. Of course, the battery may supply electric power to other devices and modules of the electronic device while supplying electric power to the switcher.

In a specific implementation, the switcher may receive the control signal by at least one of following ways.

(1) The sixth terminal of the switcher 802 is connected to a control terminal of the chip 803 having a contact-less function, and is configured to receive the control signal sent by the chip 803. When the chip 803 is a common IC card chip, the IC card chip sends the control signal to the switcher, while when chip 803 is a chip including an interface with a contact-less function and a CPU, the CPU of the chip sends the control signal.

(2) The electronic device further includes: a microcontroller unit MCU 804, in which the sixth terminal of the switcher 802 is connected to a control terminal of the MCU 804 and is configured to receive the control signal sent by the MCU 804. When the electronic device includes the MCU, the control signal may be sent by the MCU to the switcher or sent by the smart card to the MCU and then sent by the MCU to the switcher.

Embodiment 8

Figure 8:
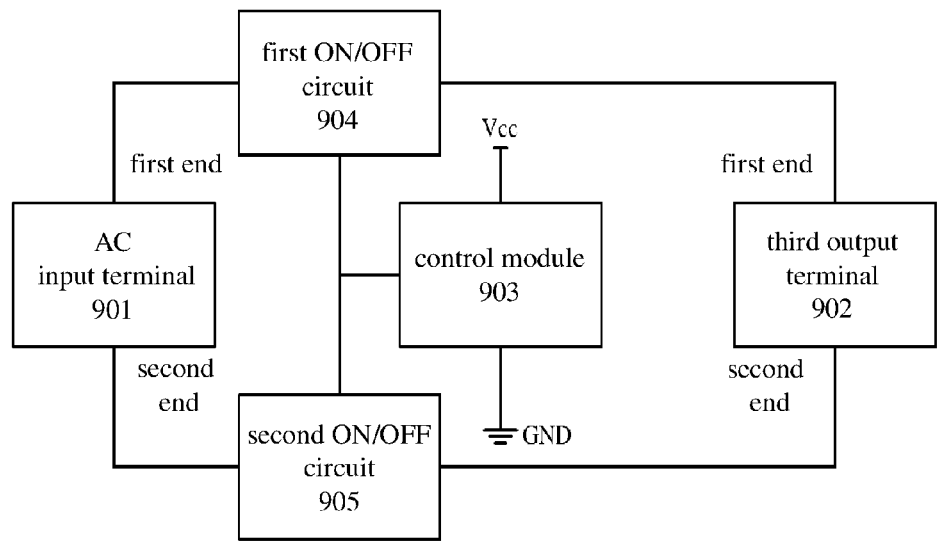
FIG. 8 is a structure block diagram of a switcher according to Embodiment 8 of the present disclosure.

FIG. 8 is a structure block diagram of a switcher according to an embodiment of the present disclosure. FIG. 8 is a structure block diagram of an alternative switcher according to an embodiment of the present disclosure. In this alternative structure, the switcher 90 includes: an AC input terminal 901, a third output terminal 902 (called as an output terminal 902 in short), a control module 903, a first ON/OFF circuit 904 and a second ON/OFF circuit 905, in which:

the first ON/OFF circuit 904 is provided to couple a first end of the AC input terminal 901 and a first end of the output terminal 902, and is configured to be controlled to transfer to an ON state or an OFF state, in which a first path between the first end of the AC input terminal 901 and the first end of the output terminal 902 is switched on and a second path between the first end of the AC input terminal 901 and the first end of the output terminal 902 is switched off when the first ON/OFF circuit 904 is in the ON state, the first path between the first end of the AC input terminal 901 and the first end of the output terminal 902 is switched off and the second path between the first end of the AC input terminal 901 and the first end of the output terminal 902 is switched on when the first ON/OFF circuit 904 is in the OFF state, in which the first path is a path from the first end of the AC input terminal 901 to the first end of the output terminal 902 and the second path is a path from the first end of the output terminal 902 to the first end of the AC input terminal 90, and vice versa;

the second ON/OFF circuit 905 is provided to couple a second end of the AC input terminal 901 and a second end of the output terminal 902, and is configured to be controlled to transfer to the ON state or the OFF state, in which the third path between the second end of the AC input terminal 901 and the second end of the output terminal 902 is switched on and a fourth path between the second end of the AC input terminal 901 and the second end of the output terminal 902 is switched off when the second ON/OFF circuit 905 is in the ON state, the third path between the second end of the AC input terminal 901 and the second end of the output terminal 902 is switched off and the fourth path between the second end of the AC input terminal 901 and the second end of the output terminal 902 is switched on when the second ON/OFF circuit 905 is in the OFF state, in which the third path is a path from the second end of the AC input terminal 901 to the second end of the output terminal 902 and the fourth path is a path from the second end of the output terminal 902 to the second end of the AC input terminal 901, and vice versa; and the control module 903 is provided to couple the operating voltage of the switcher and the common ground, and is configured to be controlled to transfer to the ON state or the OFF state, in which the control module 903 is configured to control the first ON/OFF circuit 904 and the second ON/OFF circuit 905 to transfer to the OFF state when the control module 903 transfers to the ON state, and to control either one of the first ON/OFF circuit 904 and the second ON/OFF circuit 905 to transfer to the ON state by cooperating with the AC input terminal 901 when the control module 903 is in the OFF state.

When the first path or the second path of the first ON/OFF circuit and the third path or the fourth path of the second ON/OFF circuit are in opposite flow directions, a loop will be formed between the AC input terminal and the third output terminal, and thus a signal may be able to be transmitted between the AC input terminal and the third output terminal.

Thus, with the switcher 90 provided by the embodiment of the present disclosure, a connection and disconnection of the AC input terminal 901 and the output terminal 902 may be controlled, and at the same time, a current loop may be formed within the switcher 90 after the AC input terminal 901 and the output terminal 902 are connected to an external device respectively.

As an alternative implementation of the embodiment of the present disclosure, the first ON/OFF circuit 904 includes a first controllable switch and a first freewheeling conduction element, in which the first controllable switch includes: a first connecting end of the first controllable switch, a second connecting end of the first controllable switch and a control end of the first controllable switch, in which the first freewheeling conduction element is connected between the first connecting end of the first controllable switch and the second connecting end of the first controllable switch, and a conducting direction of the freewheeling conduction element is opposite to that of the first controllable switch; and the first connecting end of the first controllable switch is configured to be connected to the first end of the AC input terminal 901, the second connecting end of the first controllable switch is configured to be connected to the first end of the output terminal 902, the control end of the first controllable switch is configured to receive the control signal from the control module 903 and to switch on the first path and switch off the second path, or to switch on the second path and switch off the first path.

As an alternative implementation of the embodiment of the present disclosure, the second ON/OFF circuit 905 includes a second controllable switch and a second freewheeling conduction element, in which the second controllable switch includes: a first connecting end of the second controllable switch, a second connecting end of the second controllable switch and a control end of the second controllable switch, the second freewheeling conduction element is connected between the first connecting end of the second controllable switch and the second connecting end of the second controllable switch, and the conducting direction of the second controllable switch is opposite to that of the second freewheeling conduction element; and the first connecting end of the second controllable switch is configured to be connected to the second end of the AC input terminal 901, the second connecting end of the second controllable switch is configured to be connected to the second end of the output terminal 902, the control end of the second controllable switch is configured to receive the control signal from the control module 903 and to switch on the third path and switch off the fourth path, or to switch on the fourth path and switch off the third path.

As an alternative implementation of the embodiment of the present disclosure, the first ON/OFF circuit 904 may use a controllable switch which is the same as that of the second ON/OFF circuit 905, or may use a controllable switch which is different from that of the second ON/OFF circuit 905, and the first ON/OFF circuit 904 may use a freewheeling conduction element the same as that of the second ON/OFF circuit 905, or may use a freewheeling conduction element different from that of the second ON/OFF circuit 905, which means that any configuration which may achieve functions of the first ON/OFF circuit 904 and the second ON/OFF circuit 905 in the embodiment of the present disclosure falls into the scope of the present disclosure.

As an alternative implementation of the embodiment of the present disclosure, the first ON/OFF circuit 904 may include a first enhanced MOS transistor (MOSFET), and the second ON/OFF circuit 905 may include a second enhanced MOS transistor (MOSFET). Alternatively, at least one of the first ON/OFF circuit 904 and the second ON/OFF circuit 905 uses an enhanced MOSFET, and the enhanced MOSFET includes a parasitic diode. An ON/OFF function of a switch may be achieved by using the enhanced MOSFET. Influence on other component parts cooperating with the switcher may be decreased by taking an advantage of a small equivalent resistance of the enhanced MOSFET, also cost is saved and reliability of the circuit may be improved.

In the embodiment, an N-channel enhanced MOSFET or a P-channel enhanced MOSFET may be used. For example, each of the first enhanced MOSFET and the second enhanced MOSFET is an N-channel MOSFET, which will be described as follows.

As an alternative implementation of the embodiment of the present disclosure, a source electrode of the first enhanced MOSFET is connected to a first end of the AC input terminal 901, a drain electrode is connected to the first end of the output terminal 902, and a grid electrode is connected to the control module 903.

As an alternative implementation of the embodiment of the present disclosure, the first ON/OFF circuit 904 may include a first bias resistor R1 besides the first enhanced MOSFET, a terminal of the first bias resistor R1 is connected to the source electrode of the first enhanced MOSFET, and the other terminal of the first bias resistor R1 is connected to the grid electrode of the first enhanced MOSFET. By setting a bias resistor between the source electrode and the grid electrode of the first enhanced MOSFET, it may be ensured that the first enhanced MOSFET may be cut-off reliably, thus guaranteeing stability and reliability of the circuit.

As an alternative implementation of the embodiment of the present disclosure, the first ON/OFF circuit 904 may include a first load component besides the first enhanced MOSFET, in which a first terminal of the first load component is connected to a grid electrode and a second terminal of the first load component is connected to the control module 903. By setting a load component between the first enhanced MOSFET and the control module, stability and reliability of the circuit may be ensured.

As an alternative implementation of the embodiment of the present disclosure, the first load component may be a resistor. When a resistance value of the first bias resistor R1 is great, influence on the AC input terminal is small, the first load component may be the resistor to ensure stability of the circuit.

As an alternative implementation of the embodiment of the present disclosure, the first load component may be a first unidirectional conduction element. An output terminal of the first unidirectional conduction element configured as a first terminal of the first load component is connected to the grid electrode of the first enhanced MOSFET, and an input terminal of the first unidirectional conduction element configured as a second terminal of the first load component is connected to the control module 903. When a resistance value of the first bias resistor R1 is small, influence on the AC input terminal is great, the first load component may be a unidirectional conduction element to avoid influence of the circuit on the AC input terminal and to improve stability and reliability of the circuit.

As an alternative implementation of the embodiment of the present disclosure, the first unidirectional conduction element may include a diode or a triode and other elements with unidirectional conduction function.

Of course, as an alternative implementation of the embodiment of the present disclosure, the first ON/OFF circuit 904 may also use a P-channel MOSFET, and a connecting relationship may be modified adaptively according to features of the MOSFET.

As an alternative implementation of the embodiment of the present disclosure, a source electrode of the second enhanced MOSFET is connected to a second end of the AC input terminal 901, a drain electrode is connected to the second end of the output terminal 902, and a grid electrode is connected to the control module 903.

As an alternative implementation of the embodiment of the present disclosure, the second ON/OFF circuit 905 may include a second bias resistor R2 besides the second enhanced MOSFET, a terminal of the second bias resistor R2 is connected to the source electrode of the second enhanced MOSFET, and the other terminal of the second bias resistor R2 is connected to the grid electrode of the second enhanced MOSFET. By setting a bias resistor between the source electrode and the grid electrode of the second enhanced MOSFET, it may be ensured that the second enhanced MOSFET may be cut-off reliably, thereby guaranteeing stability and reliability of the circuit.

As an alternative implementation of the embodiment of the present disclosure, the second ON/OFF circuit 905 may include a second load component besides the second enhanced MOSFET, in which a first terminal of the second load is connected to a grid electrode and a second terminal of the second load component is connected to the control module 903. By setting a load component between the second enhanced MOSFET and the control module, stability and reliability of the circuit may be ensured.

As an alternative implementation of the embodiment of the present disclosure, the second load component may be a resistor. When a resistance value of the second bias resistor R2 is great, influence on the AC input terminal is small, the second load component may be the resistor to ensure stability of the circuit.

As an alternative implementation of the embodiment of the present disclosure, the second load component may be a second unidirectional conduction element. An output terminal of the second unidirectional conduction element configured as a first terminal of the second load component is connected to the grid electrode of the second enhanced MOSFET, and an input terminal of the second unidirectional conduction element configured as a second terminal of the second load component is connected to the control module 903. When a resistance value of the second bias resistor R2 is small, influence on the AC input terminal is great, the second load component may be a unidirectional conduction element to avoid influence of the circuit on the AC input terminal and to improve stability and reliability of the circuit.

As an alternative implementation of the embodiment of the present disclosure, the second unidirectional conduction element may include a diode or a triode and other elements with the unidirectional conduction function.

Of course, as an alternative implementation of the embodiment of the present disclosure, the second ON/OFF circuit 905 may also use a P-channel MOSFET, and a connecting relationship may be modified adaptively according to features of the MOSFET.

As another alternative implementation of the embodiment of the present disclosure, the first ON/OFF circuit 904 includes a first controllable switch and a first freewheeling conduction element, and the second ON/OFF circuit 905 includes a second controllable switch and a second freewheeling conduction element.

As an alternative implementation of the embodiment of the present disclosure, when the first ON/OFF circuit 904 includes the first controllable switch and the first freewheeling conduction element, the first ON/OFF circuit 904 may include a first MOSFET component. The first MOSFET component may include a first MOSFET as the first controllable switch, a first freewheeling diode as the first freewheeling conduction element, in which the first freewheeling diode is connected between a source electrode and a drain electrode of the first MOSFET. By using the first MOSFET component, an ON/OFF function of the switch may be realized, and since an equivalent resistance of the first MOSFET component is small, influence on other component parts cooperating with the switcher may be decreased, also cost may be saved and reliability of the circuit may be improved.

As an alternative implementation of the embodiment of the present disclosure, the first MOSFET component may include an N-channel MOSFET component, which may include a first N-channel MOSFE, and a first freewheeling diode of which an input terminal is connected to a source electrode of the N-channel MOSFET and an output terminal is connected to a drain electrode of the N-channel MOSFET. An example that the first MOSFET component includes the first N-channel MOSFET and the first freewheeling diode is described as follows.

As an alternative implementation of the embodiment of the present disclosure, a source electrode of the first N-channel MOSFET is configured as the first connecting end of the first controllable switch and is connected to the first end of the AC input terminal 901, a drain electrode is configured as the second connecting end of the first controllable switch and is connected to the first end of the output terminal 902, a grid electrode is configured as the control end of the first controllable switch and is connected to the control module 903.

As an alternative implementation of the embodiment of the present disclosure, the first controllable switch may include a first bias resistor R1 besides the first MOSFET component, the source electrode of the first N-channel MOSFET is configured as the first connecting end of the first controllable switch and is connected to the first end of the AC input terminal 901, the drain electrode is configured as the second connecting end of the first controllable switch and is connected to the first end of the output terminal 902, the grid electrode is configured as a control end of the first controllable switch and is connected to the control module 903, a terminal of the first bias resistor R1 is connected to the source electrode of the first N-channel MOSFET, and the other terminal of the first bias resistor R1 is connected to the grid electrode of the first N-channel MOSFET. By setting a bias resistor between the source electrode and the grid electrode of the first N-channel MOSFET, it may be ensured that the first N-channel MOSFET in the first MOSFET component may be cut-off reliably, thereby guaranteeing stability and reliability of the circuit.

As an alternative implementation of the embodiment of the present disclosure, the first controllable switch also includes a third load component besides the first MOSFET component, the source electrode of the first N-channel MOSFET is configured as the first connecting end of the first controllable switch and is connected to the first end of the AC input terminal 901, the drain electrode is configured as the second connecting end of the first controllable switch and is connected to the first end of the output terminal 902, the grid electrode of the first N-channel MOSFET is connected to the control module 903 via the third load component, which means that a first terminal of the third load component is connected to the grid electrode, and the second terminal of the third load component is configured as the control end of the first controllable switch and is connected to the control module 903. By setting a load component connected to the first N-channel MOSFET and the control module, stability and reliability of the circuit may be ensured.

As an alternative implementation of the embodiment of the present disclosure, the first controllable switch may include the first MOSFET component, the third load component and the first bias resistor R1. The source electrode of the first N-channel MOSFET is configured as the first connecting end of the first controllable switch and is connected to the first end of the AC input terminal 901, the drain electrode is configured as the second connecting end of the first controllable switch and is connected to the first end of the output terminal 902, the grid electrode of the first N-channel MOSFET is connected to the control module 903 via the third load component, which means that a first terminal of the third load component is connected to the grid electrode, and a second terminal of the third load component is configured as the control end of the first controllable switch and is connected to the control module 903. A terminal of the first bias resistor R1 is connected to the source electrode of the first N-channel MOSFET, and the other terminal of the first bias resistor R1 is connected to the grid electrode of the first N-channel MOSFET.

As an alternative implementation of the embodiment of the present disclosure, the third load component may be a resistor. When a resistance value of the first bias resistor R1 is great, influence on the AC input terminal is small, the third load component may be the resistor to ensure stability of the circuit.

As an alternative implementation of the embodiment of the present disclosure, the third load component may be a third unidirectional conduction element. An output terminal of the third unidirectional conduction element configured as a first terminal of the third load component is connected to the grid electrode of the first N-channel MOSFET, and an input terminal of the third unidirectional conduction element configured as a second terminal of the third load component is connected to the control module 903. When a resistance value of the first bias resistor R1 is small, influence on the AC input terminal is great, the third load component may be the third unidirectional conduction element to avoid influence of the circuit on the AC input terminal and to improve stability and reliability of the circuit.

As an alternative implementation of the embodiment of the present disclosure, the third unidirectional conduction element may be implemented by a diode or a triode and other elements with the unidirectional conduction function.

Of course, as an alternative implementation of the embodiment of the present disclosure, the first ON/OFF circuit 904 may also include a P-channel MOSFET component, and a connecting relationship may be modified according to features of the MOSFET component.

As an alternative implementation of the embodiment of the present disclosure, the first MOSFET (including a first N-channel MOSFET and a first P-channel MOSFET) may be a junction field-effect transistor (JFET).

As an alternative implementation of the embodiment of the present disclosure, when the second ON/OFF circuit 905 includes the second controllable switch and the second freewheeling conduction element, the second ON/OFF circuit 905 may include a second MOSFET component. The second MOSFET component may include a second MOSFET as the second controllable switch, a second freewheeling diode as the second freewheeling conduction element, in which the second freewheeling diode is connected between a source electrode and a drain electrode of the second MOSFET. By using the second MOSFET component, an ON/OFF function of the switch may be realized, and since an equivalent resistance of the second MOSFET component is small, influence on other component parts cooperating with the switcher may be decreased, also cost may be saved and reliability of the circuit may be improved.

As an alternative implementation of the embodiment of the present disclosure, the second MOSFET component may include an N-channel MOSFET component, which may include a second N-channel MOSFET, and a second freewheeling diode of which an input terminal is connected to a source electrode of the second N-channel MOSFET and an output terminal is connected to a drain electrode of the second N-channel MOSFET. An example that the second MOSFET component includes the second N-channel MOSFET and the second freewheeling diode is described as follows.

As an alternative implementation of the embodiment of the present disclosure, a source electrode of the second N-channel MOSFET is configured as the first connecting end of the second controllable switch and is connected to the second end of the AC input terminal 901, a drain electrode is configured as the second connecting end of the second controllable switch and is connected to the second end of the output terminal 902, a grid electrode is configured as the control end of the second controllable switch and is connected to the control module 903.

As an alternative implementation of the embodiment of the present disclosure, the second controllable switch may include a second bias resistor R2 besides the second MOSFET component, the source electrode of the second N-channel MOSFET is configured as the first connecting end of the second controllable switch and is connected to the second end of the AC input terminal 901, the drain electrode is configured as the second connecting end of the second controllable switch and is connected to the second end of the output terminal 902, the grid electrode is configured as the control end of the second controllable switch and is connected to the control module 903, a terminal of the second bias resistor R2 is connected to the source electrode of the second N-channel MOSFET, and the other terminal of the second bias resistor R2 is connected to the grid electrode of the second N-channel MOSFET. By setting a bias resistor between the source electrode and the grid electrode of the second N-channel MOSFET, it may be ensured that the second N-channel MOSFET in the second MOSFET component may be cut-off reliably, thereby guaranteeing stability and reliability of the circuit.

As an alternative implementation of the embodiment of the present disclosure, the second controllable switch further includes a fourth load component besides the second MOSFET component, the source electrode of the second N-channel MOSFET is configured as the first connecting end of the second controllable switch and is connected to the second end of the AC input terminal 901, the drain electrode is configured as the second connecting end of the second controllable switch and is connected to the second end of the output terminal 902, the grid electrode of the second N-channel MOSFET is connected to the control module 903 via the fourth load component, which means that the first terminal of the fourth load component is connected to the grid electrode, and the second terminal of the fourth load component is configured as the control end of the second controllable switch and is connected to the control module 903. By setting a load component connected to the second N-channel MOSFET and the control module, stability and reliability of the circuit may be ensured.

As an alternative implementation of the embodiment of the present disclosure, the second controllable switch may include the second MOSFET component, the fourth load component and the second bias resistor R2. The source electrode of the second N-channel MOSFET is configured as the first connecting end of the second controllable switch and is connected to the second end of the AC input terminal 901, the drain electrode is configured as the second connecting end of the second controllable switch and is connected to the second end of the output terminal 902, the grid electrode of the second N-channel MOSFET is connected to the control module 903 via the fourth load component, which means that the first terminal of the fourth load component is connected to the grid electrode, and the second terminal of the fourth load component is configured as the control end of the second controllable switch and is connected to the control module 903. A terminal of the second bias resistor R2 is connected to the source electrode of the second N-channel MOSFET, and the other terminal of the second bias resistor R2 is connected to the grid electrode of the second N-channel MOSFET.

As an alternative implementation of the embodiment of the present disclosure, the fourth load component may be a resistor. When a resistance value of the second bias resistor R2 is great, influence on the AC input terminal is small, the fourth load component may be the resistor to ensure stability of the circuit.

As an alternative implementation of the embodiment of the present disclosure, the fourth load component may be a fourth unidirectional conduction element. An output terminal of the fourth unidirectional conduction element configured as a first terminal of the fourth load component is connected to the grid electrode of the second N-channel MOSFET, and an input terminal of the fourth unidirectional conduction element configured as a second terminal of the fourth load component is connected to the control module 903. When a resistance value of the second bias resistor R2 is small, influence on the AC input terminal is great, the fourth load component may be the fourth unidirectional conduction element to avoid influence of the circuit on the AC input terminal and to improve stability and reliability of the circuit.

As an alternative implementation of the embodiment of the present disclosure, the fourth unidirectional conduction element may include a diode or a triode and other elements with the unidirectional conduction function.

Of course, as an alternative implementation of the embodiment of the present disclosure, the second ON/OFF circuit 905 may also include a P-channel MOSFET component, and a connecting relationship may be modified according to features of the MOSFET component.

As an alternative implementation of the embodiment of the present disclosure, the second MOSFET (including a second N-channel MOSFET and a second P-channel MOSFET) may be a junction field-effect transistor (JFET).

As an alternative implementation of the embodiment of the present disclosure, the first ON/OFF circuit 904 may include a P-channel MOSFET component, and the second ON/OFF circuit 905 may also include a P-channel MOSFET component. Of course, the first ON/OFF circuit 904 and the second ON/OFF circuit 905 may include different kinds of MOSFET components, for example, the first ON/OFF circuit 904 may include an N-channel MOSFET component, and the second ON/OFF circuit 905 may include a P-channel MOSFET component, etc. Any controllable switch which may achieve functions of the first ON/OFF circuit 904 and the second ON/OFF circuit 905 in the embodiment of the present disclosure falls into the scope of the present disclosure.

As an alternative implementation of the embodiment of the present disclosure, the control module 903 may be a third controllable switch, and the third controllable switch includes a first connecting end of the third controllable switch, a second connecting end of the third controllable switch and a control end of the third controllable switch, in which the first connecting end of the third controllable switch is configured to be connected to the operating voltage, the second connecting end of the third controllable switch is configured to be grounded, and the control end of the third controllable switch is configured to receive the control signal from outside and to switch on or switch off according to the control signal, and the first connecting end of the third controllable switch is further configured to be connected to a control end of the first ON/OFF circuit 904 and a control end of the second ON/OFF circuit 905, and to control the first ON/OFF circuit 904 and the second ON/OFF circuit 905 to transfer to the OFF state when the control module 903 is in the ON state, and to control either one of the first ON/OFF circuit 904 and the second ON/OFF circuit 905 to transfer to the ON state by cooperating with the AC input terminal 901 when the control module 903 is in the OFF state.

As an alternative implementation of the embodiment of the present disclosure, when the control module 903 is the third controllable switch, a third MOSFET may be included. The third controllable switch may also include a third bias resistor R3, which is configured to provide a bias voltage to the first MOSFET and/or the second MOSFET and to limit the current when the third MOSFET is turned on. As an alternative implementation of the embodiment of the present disclosure, the third MOSFET component may be implemented as an N-channel MOSFET component, the drain electrode is configured as the first connecting end of the third controllable switch and is connected to the operating voltage via the third bias resistor R3, a terminal of the third bias resistor R3 is connected to the drain electrode, and the other terminal of the third bias resistor R3 is connected to the operating voltage, and the source electrode is configured as the second connecting end of the third controllable switch and is configured to be grounded, and the grid electrode is configured as the control end of the third controllable switch and is configured to receive the control signal from outside. Of course, the control module 903 may also be implemented as a P-channel MOSFET component, and a connecting relationship may be modified according to features of the MOSFET component.

In the embodiment, the third MOSFET may be a junction field-effect transistor (JFET) or an enhanced MOSFET, which is not limited in this embodiment.

Figure 9:
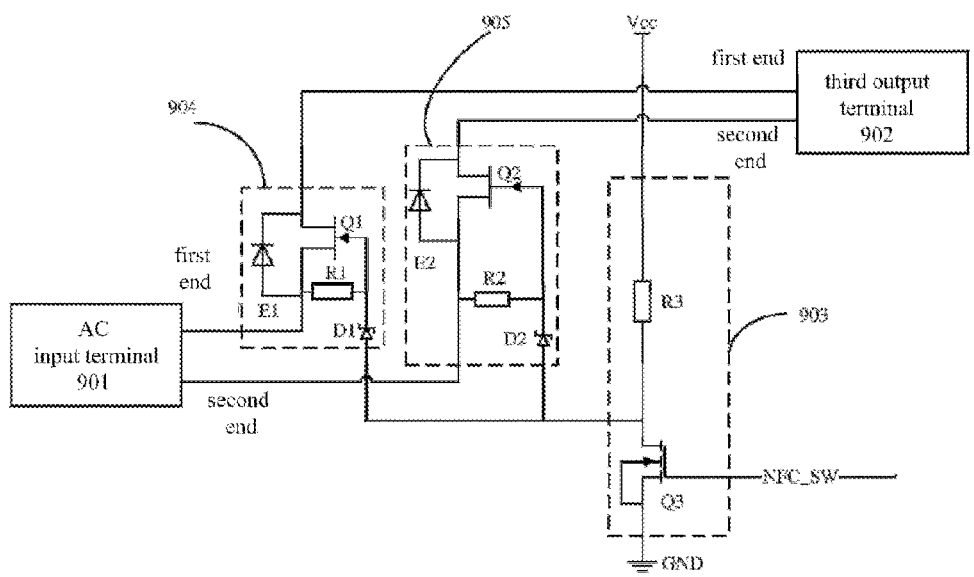
FIG. 9 is a schematic circuit diagram of the switcher according to Embodiment 8 of the present disclosure.

The switcher provided by the present disclosure is described in the following. FIG. 9 is an alternative schematic circuit diagram of the switcher according to an embodiment of the present disclosure. In this alternative schematic circuit diagram, the first ON/OFF circuit 904 includes the first N-channel MOSFET (JEFT) Q1 and the first freewheeling diode E1 which are configured as the first MOSFET component, the first diode D1 as the first unidirectional conduction element, and the first bias resistor R1, the second ON/OFF circuit 905 includes the second N-channel MOSFET Q2 and the second freewheeling diode E2 which are configured as the second MOSFET component, the second diode D2 as the second unidirectional conduction element, and the second bias resistor R2, and the control module 903 includes the third N-channel MOSFET Q3 and the third bias resistor R3, in which the first end of the AC input terminal 901 is connected to the source electrode of the first N-channel MOSFET Q1, the drain electrode of the first N-channel MOSFET Q1 is connected to the first end of the third output terminal 902 (called as an output terminal 902 in short), the first bias resistor R1 is connected between the source electrode and the grid electrode of the first N-channel MOSFET Q1, the grid electrode of the first N-channel MOSFET Q1 is connected to the output terminal 902 of the first diode D1, the input terminal of the first diode D1 is connected to the drain electrode of the third N-channel MOSFET Q3, the input terminal of the first freewheeling diode E1 is connected to the source electrode of the first N-channel MOSFET Q1, the output terminal of the first freewheeling diode E1 is connected to the drain electrode of the first N-channel MOSFET Q1; the second end of the AC input terminal 901 is connected to the source electrode of the second N-channel MOSFET Q2, the drain electrode of the second N-channel MOSFET Q2 is connected to the first end of the output terminal 902, the second bias resistor R2 is connected between the source electrode and the grid electrode of the second N-channel MOSFET Q2, the grid electrode of the second N-channel MOSFET Q2 is connected to the output terminal 902 of the second diode D2, the input terminal of the second diode D2 is connected to the drain electrode of the third N-channel MOSFET Q3, the input terminal of the second freewheeling diode E2 is connected to the source electrode of the second N-channel MOSFET Q2, the output terminal of the second freewheeling diode E2 is connected to the drain electrode of the second N-channel MOSFET Q2; the drain electrode of the third N-channel MOSFET Q3 is connected to the operating voltage via the third bias resistor R3, the source electrode of the third N-channel MOSFET Q3 is grounded, the grid electrode of the third N-channel MOSFET Q3 is connected to the external control end and is configured to receive the control signal from outside. The N-channel MOSFET component may be but is not limited to the following types: 2N7002, FDV301, and FDV303 etc. The above types include MOSFET and freewheeling diode and of course protection diode etc., which is not described herein. The diode may be but is not limited to the following types: BAR43, BAR54, BAR46, and BAR50 etc. In addition, resistance values of the first bias resistor R1 and the second bias resistor R2 may be selected according to requirements, and the resistance value of the third bias resistor R3 may also be selected according to requirements, which are not described herein. The resistance values of the first bias resistor R1 and the second bias resistor R2 may be greater than or equal to tenfold of the resistance value of the third bias resistor R3. For example, the resistance value of the first bias resistor R1 may range from 10 kΩ to 10 MΩ, preferably, may range from 100 kΩ to 9 MΩ, and more preferably, may range from 1 MΩ to 5 MΩ; the resistance value of the third bias resistor R3 may range from 1 kΩ to 1 MΩ, preferably, may range from 10 kΩ to 900 k Q, and more preferably, may range from 100 kΩ to 500 k Q.

For example, the first end of the AC input terminal 901 is at a high level, the second end of the AC input terminal 901 is at a low level, the AC input terminal of the switcher is connected to a first external device, the output terminal is connected to a second external device, the working principle of the switcher 90 will be described in brief as follows. In an original state, the grid electrode of the first N-channel MOSFET Q1 and the grid electrode of the second N-channel MOSFET Q2 are connected to VCC at high level via the first diode D1 and the second diode D2 respectively. When the control signal output via the control end outside is at a low level or there is no level signal, the third N-channel MOSFET Q3 is in an OFF state. At this time, the grid electrode of the first N-channel MOSFET Q1 and the grid electrode of the second N-channel MOSFET Q2 are at high levels. Since the first end of the AC input terminal 901 is at a high level and the second end of the AC input terminal 901 is at a low level, the first N-channel MOSFET Q1 is in an OFF state, the first freewheeling diode E1 is turned on and the second N-channel MOSFET Q2 is in an ON state. At this time, the first external device may output the AC signal via the AC input terminal 901 to the second external device connected to the output terminal 902, the flowing direction of the current is: first external device→first end of the AC input terminal 901→first freewheeling diode E1→first end of the output terminal 902→second external device→second end of the output terminal 902→second N-channel MOSFET Q2→second end of the AC input terminal 901→first external device. When the control signal output by the external control end is at a high level, the third N-channel MOSFET Q3 is in the ON state. At this time, the grid electrode of the first N-channel MOSFET Q1 and the grid electrode of the second N-channel MOSFET Q2 are at low levels. Since the first end of the AC input terminal 901 is at a high level and the second end of the AC input terminal 901 is at a low level, the first N-channel MOSFET Q1 and the second N-channel MOSFET Q2 both are in the OFF state. At this time, the AC input terminal 901 is disconnected from the output terminal 902, a signal is unable to be transmitted between the first external device and the second external device.

Of course, when the first end of the AC input terminal 901 is at a low level and the second end of the AC input terminal 901 is at a high level, the principle is similar as the description above, which is not described herein.

Embodiment 9

Figure 10:
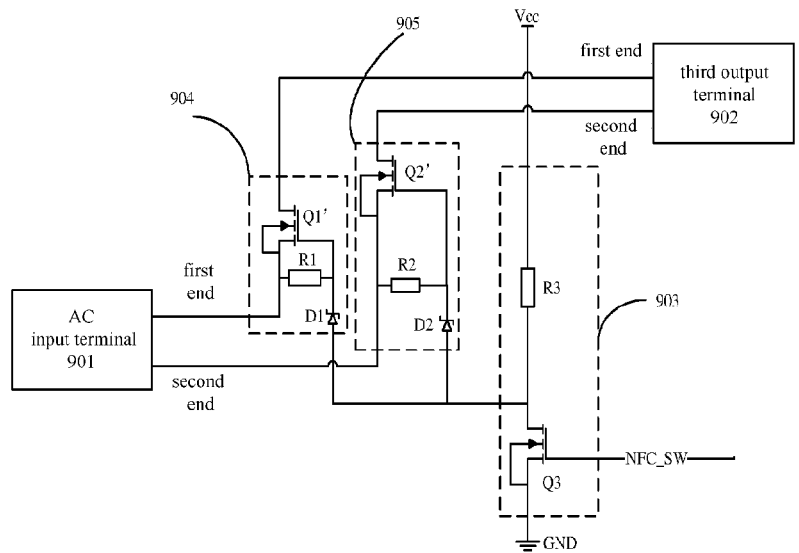
FIG. 10 is a schematic circuit diagram of the switcher according to Embodiment 9 of the present disclosure.

According to the embodiment of the present disclosure, a specific switcher is provided, as shown in FIG. 10. FIG. 10 is an alternative schematic circuit diagram of the switcher according to an embodiment of the present disclosure.

A difference between the switcher provided by this embodiment and the switcher shown in Embodiment 8 and FIG. 9 is that a first enhanced MOSFET component Q1' is used instead of the first MOSFET component (the first N-channel MOSFET (JEFT) Q1 and the first freewheeling diode E1) in the first ON/OFF circuit 904, a second enhanced MOSFET component Q2' is used instead of the second MOSFET component (the second N-channel MOSFET (JEFT) Q2 and the second freewheeling diode E2) in the second ON/OFF circuit 905, a parasitic diode is configured in an enhanced MOSFET, in which function of the parasitic diode is same as that of a freewheeling diode and the conducting direction of the parasitic diode is opposite to that of a MOSFET. A connecting relationship is shown in FIG. 10. Other elements are same as those in FIG. 9, which are shown in description of FIG. 9.

For example, the first end of the AC input terminal 901 is at a high level, the second end of the AC input terminal 901 is at a low level, the AC input terminal of the switcher is connected to a first external device, the output terminal is connected to a second external device, the working principle of the switcher 90 (as shown in FIG. 10) will be described in brief as follows. In an original state, the grid electrode of the first enhanced MOSFET Q1' and the grid electrode of the second enhanced MOSFET Q2' are connected to VCC at high level via the first diode D1 and the second diode D2 respectively. When the control signal output via the external control end is at a low level or there is no level signal, the third N-channel MOSFET Q3 is in an OFF state. At this time, the grid electrode of the first enhanced MOSFET Q1' and the grid electrode of the second enhanced MOSFET Q2' are at high levels. Since the first end of the AC input terminal 901 is at a high level and the second end of the AC input terminal 901 is at a low level, the parasitic diode configured in the first enhanced MOSFET Q1' is turned on, which means that the Q1' is turned on in reverse, and the second enhanced MOSFET Q2' is in an OFF state. At this time, the first external device may output the AC signal via the AC input terminal 901 to the second external device connected to the third output terminal 902 (called as the output terminal 902 in short) outside, the flowing direction of the current is: first external device→first end of the AC input terminal 901→first enhanced MOSFET Q1' →first end of the output terminal 902→second external device→second end of the output terminal 902→second enhanced MOSFET Q2' →second end of the AC input terminal 901→first external device. When the control signal output by the external control end is at a high level, the third N-channel MOSFET Q3 is in the ON state. At this time, the grid electrode of the first enhanced MOSFET Q1' and the grid electrode of the second enhanced MOSFET Q2' are at low levels. Since the first end of the AC input terminal 901 is at a high level and the second end of the AC input terminal 901 is at a low level, the first enhanced MOSFET Q1' and the second enhanced MOSFET Q2' both are in the OFF state. At this time, the AC input terminal 901 is disconnected from the output terminal 902, a signal is unable to be transmitted between the first external device and the second external device.

Of course, when the first end of the AC input terminal 901 is at a low level and the second end of the AC input terminal 901 is at a high level, the principle is similar as the description above, which is not described herein.

Embodiment 10

Figure 11:
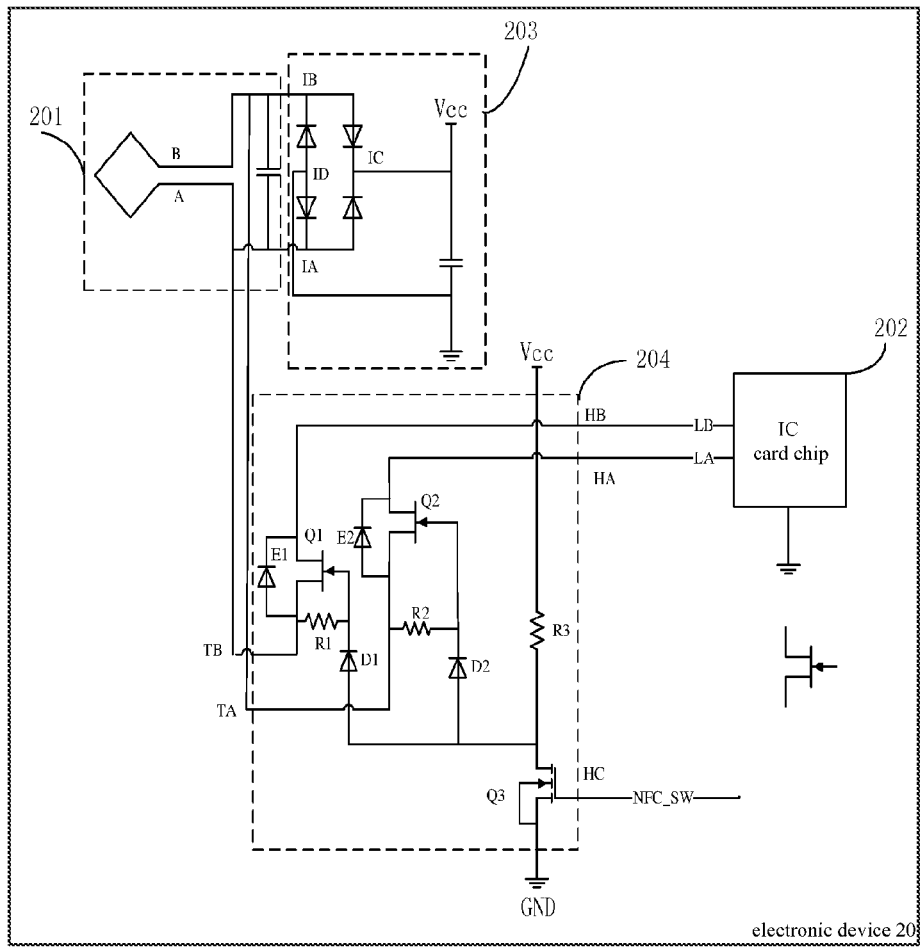
FIG. 11 is a schematic circuit diagram of the electronic device according to Embodiment 10 of the present disclosure.

An electronic device 20 is provided according to the embodiment of the present disclosure. The electronic device 20 includes: a coil 201, a chip 202 with a contact-less function, a rectifier 203 and a switcher 204. FIG. 11 is a schematic circuit diagram of the electronic device according to the embodiment of the present disclosure. The rectifier 203 adopts a diode bridge rectifier as shown in FIG. 3, and concerning the description of the diode bridge rectifier, reference may be made to the description of FIG. 3. The switcher 204 adopts the switcher in Embodiment 8, and concerning the circuit of switcher, reference may be made to FIG. 9, and the chip is also configured with a rectifier inside. As an alternative way, the rectifier also adopts the diode bridge rectifier similar to FIG. 3, in which an IA terminal of the diode bridge rectifier is connected to a first input terminal A of the coil, an IB terminal of the diode bridge rectifier is connected to a second input terminal B of the coil, an IC terminal of the diode bridge rectifier is a power supplying terminal VCC, and an ID terminal of the diode bridge rectifier is grounded, in which a filtering capacitor configured to filter is connected between the power supplying terminal VCC and the ground.

The first output terminal A of the coil is connected to the first end TB of the AC input terminal of the switcher 204, the second output terminal B of the coil is connected to the second end TA of the AC input terminal of the switcher 204, the first end HB of the output terminal of the switcher 204 is connected to the input terminal LB of the chip 202, the second end HA of the output terminal of the switcher 204 is connected to the input terminal LA of the chip 202, the terminal HC of the switcher 204 is configured to receive the control signal, in which NFC_SW_is the control signal. As shown in FIG. 11, the switcher 202 includes: the first N-channel MOSFET Q1, the second N-channel MOSFET Q2, the third N-channel MOSFET Q3, the first freewheeling diode E1, the second freewheeling diode E2, the first bias resistor R1, the second bias resistor R2, the third bias resistor R3, the first diode D1 and the second diode D2, and concerning the connection and the circuit principle of elements in the switcher, reference may be made to the description of FIG. 9 in Embodiment 8.

For example, the first output terminal A of the coil is at a high level, the second output terminal B of the coil is at a low level, the working principle of the electronic device 20 will be described in brief as follows. In an original state, the grid electrode of the first N-channel MOSFET Q1 and the grid electrode of the second N-channel MOSFET Q2 are connected to VCC at high level via the first diode D1 and the second diode D2 respectively. When the control signal output via the external control end HC is at a low level or there is no level signal, the third N-channel MOSFET Q3 is in an OFF state. At this time, the grid electrode of the first N-channel MOSFET Q1 and the grid electrode of the second N-channel MOSFET Q2 are at high levels. Since the terminal TB is at a high level and the terminal TA is at a low level, the first N-channel MOSFET Q1 is in the OFF state, the first freewheeling diode E1 is turned on and the second N-channel MOSFET Q2 is in an ON state. At this time, the coil 201 may output the AC signal via the terminal TB and the terminal TA of the switcher 204 to the chip 202, the flowing direction of the current is: A of the coil 201→TB→first freewheeling diode E1→HB→chip 202→HA→second N-channel MOSFET Q2→TA→B of the coil 201. When the control signal NFC_SW output by the external control end HC is at a high level, the third N-channel MOSFET Q3 is in the ON state. At this time, the grid electrode of the first N-channel MOSFET Q1 and the grid electrode of the second N-channel MOSFET Q2 are at low levels. Since the first end TB of the AC input terminal of the switcher 204 is at a high level and the second end TA of the AC input terminal of the switcher 204 is at a low level, the first N-channel MOSFET Q1 and the second N-channel MOSFET Q2 both are in the OFF state. At this time, TB is disconnected from LB and TA is disconnected from LA, a signal is unable to be transmitted between the coil 201 and the chip 202.

Of course, when the first output terminal B of the coil is at a low level and the second output terminal A of the coil is at a high level, the principle is similar as the description above, which is not described herein.

In this embodiment, when TB is disconnected from LB and TA is disconnected from LA, the signal is unable to be transmitted between the coil 201 and the chip 202. Since energy is not consumed in the chip 202, a load output capacity of the rectifier may be improved effectively.

Embodiment 11

Figure 12:
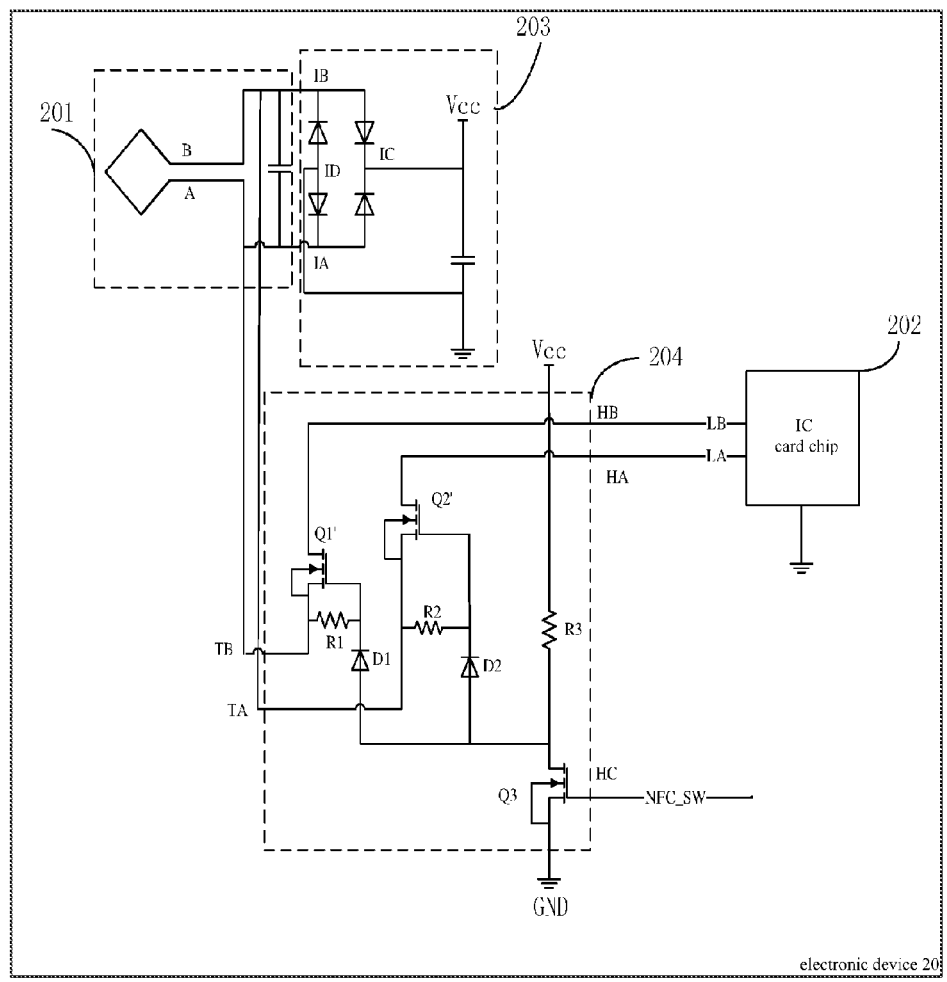
FIG. 12 is a schematic circuit diagram of the electronic device according to Embodiment 11 of the present disclosure.

An electronic device 20 is provided according to the embodiment of the present disclosure. As shown in FIG. 12, FIG. 12 is a schematic circuit diagram of an alternative electronic device according to the embodiment of the present disclosure.

A difference between this embodiment and Embodiment 10 is that the switcher in Embodiment 10 is replaced, in the switcher, a first enhanced MOSFET Q1' is used instead of the first N-channel MOSFET (JEFT) Q1 and the freewheeling diode E1 in Embodiment 10, a second enhanced MOSFET Q2' is used instead of the second N-channel MOSFET (JEFT) Q2 and the second freewheeling diode E2, a parasitic diode is configured in an enhanced MOSFET, in which function of the parasitic diode is same as that of a freewheeling diode and the conducting direction of the parasitic diode is opposite to that of a MOSFET. A circuit connecting relationship is shown in FIG. 12. Other elements are same as those in Embodiment 10, reference may be made to description of FIG. 11 in Embodiment 10. For example, the first output terminal A of the coil is at a high level, the second output terminal B of the coil is at a low level, the working principle of the electronic device 20 will be described in brief as follows. In an original state, the grid electrode of the first enhanced MOSFET Q1' and the grid electrode of the second enhanced MOSFET Q2' are connected to VCC at high level via the first diode D1 and the second diode D2 respectively. When the control signal output via the external control end HC is at a low level or there is no level signal, the third N-channel MOSFET Q3 is in an OFF state. At this time, the grid electrode of the first enhanced MOSFET Q1' and the grid electrode of the second enhanced MOSFET Q2' are at high levels. Since the terminal TB is at a high level and the terminal TA is at a low level, the parasitic diode configured in the first enhanced MOSFET Q1' is turned on in reverse, which means that the Q1' is turned on in reverse, and the second enhanced MOSFET Q2' is in the ON state. At this time, the coil 201 may output the AC signal via the terminal TB and the terminal TA of the switcher 204 to the chip 202, the flowing direction of the current is: A of the coil 201→→TB→first enhanced MOSFET Q1' →HB→chip 202→HA→second enhanced MOSFET Q2' →TA→B of the coil 201. When the control signal NFC_SW output by the external control end HC is at a high level, the third N-channel MOSFET Q3 is in the ON state. At this time, the grid electrode of the first enhanced MOSFET Q1' and the grid electrode of the second enhanced MOSFET Q2' are at low levels. Since the first end TB of the AC input terminal of the switcher 204 is at a high level and the second end TA of the AC input terminal of the switcher 204 is at a low level, the first enhanced MOSFET Q1' and the second enhanced MOSFET Q2' both are in the OFF state. At this time, TB is disconnected from LB and TA is disconnected from LA, a signal is unable to be transmitted between the coil 201 and the chip 202.

Of course, when the first output terminal B of the coil is at a low level and the second output terminal A of the coil is at a high level, the principle is similar as the description above, which is not described herein.

In this embodiment, when TB is disconnected from LB and TA is disconnected from LA, the signal is unable to be transmitted between the coil 201 and the chip 202. Since energy is not consumed in the chip 202, a load output capacity of the rectifier may be improved effectively.

In Embodiment 1 to Embodiment 11 described above, as an alternative implementation, the output terminal of the rectifier is connected to apparatuses to be supplied with power in the electronic device. In an alternative implementation of an embodiment of the present disclosure, the output terminal of the rectifier is connected to other apparatuses (such as a display, a button, a secure chip, etc.) in which electric power is needed to be supplied in the electronic device, such that other apparatuses in the electronic device may work regularly without electric power supply, which saves energy.

Additionally, the electronic device further includes: a battery apparatus; a terminal of the battery apparatus is connected to an output terminal of the rectifier. In an alternative implementation of the embodiment, the electronic device further includes the battery apparatus in order to make a full usage of electric power, in which electric power output by the rectifier may be used for charging the battery apparatus.

Additionally, the battery apparatus further includes a charging control circuit and a rechargeable battery. The AC coil is configured to charge the rechargeable battery when the charging control circuit is turned on. In an alternative implementation of the embodiment, the charging control circuit is configured to control whether to charge the rechargeable battery. For example, the charging control circuit may be a switch configured to control whether to charge the rechargeable battery by controlling the switch to be turned on or off. When the rechargeable battery is needed to be charged, the switch is switched on, and when it is unnecessary to charge the rechargeable battery, the switch is switched off.

Additionally, another terminal of the battery apparatus is connected to the power supplying terminal of the chip. Specifically, the battery apparatus may be also connected to the chip, and electric power is supplied to the chip by using the battery apparatus without configuring a battery for the chip, such that the chip may work when the AC coil is cut off.

Compared to the prior arts, the electronic device provided by the embodiment of the present disclosure may acquire electricity from the AC coil of the electronic device at the same time when performing Near Field Communication (NFC) with other devices, such that the electronic device may word normally or the power supply configured in the electronic device may be charged, thus improving the utilization of the electronic device and avoiding waste of electric power. When a rectifier shares a coil with a chip with a contact-less function, the electronic device is configured to perform a communication and to acquire electric power at the same time when the AC coil and the chip are connected, and electricity acquisition efficiency of the rectifier may be improved when the coil and the chip are disconnected.

Compared to the prior arts, embodiments of the present disclosure provide an electronic device, when a rectifier shares a coil with a chip with a contact-less function, the electronic device may acquire electricity from the coil thereof at the same time when performing Near Field Communication (NFC) with other devices when the coil and the chip are connected, in which the electricity acquired is configured to support the electronic device to work or to charge a power supply configured in the electronic device, such that communication and electricity acquisition may be realized at the same time, which may improve utilization of the electronic device and avoid waste of electric power. When the coil and the chip are disconnected, since the chip does not consume electricity any more, the rectifier may be able to receive electricity to maximum extent for supplying power, which may improve electricity acquisition efficiency of the rectifier. Additionally, in the embodiments of the present disclosure, since a switcher is added between the coil and the chip, a problem that the rectifier and the chip cannot be connected to a common ground may be solved, such that the electronic device may work normally.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, which should be understood by those skilled in the art.

It should be understood that each part of the present disclosure may be realized by the hardware, software, firmware or their combination. In the above embodiments, a plurality of steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

Those skilled in the art shall understand that all or parts of the steps in the above exemplifying method of the present disclosure may be achieved by commanding the related hardware with programs. The programs may be stored in a computer readable storage medium, and the programs comprise one or a combination of the steps in the method embodiments of the present disclosure when run on a computer.

In addition, each function cell of the embodiments of the present disclosure may be integrated in a processing module, or these cells may be separate physical existence, or two or more cells are integrated in a processing module. The integrated module may be realized in a form of hardware or in a form of software function modules. When the integrated module is realized in a form of software function module and is sold or used as a standalone product, the integrated module may be stored in a computer readable storage medium.

The storage medium mentioned above may be read-only memories, magnetic disks, CD, etc.

Reference throughout this specification to "an embodiment," "some embodiments," "one embodiment", "another example," "an example," "a specific example," or "some examples," means that a particular feature, structure, material, or characteristic described in connection with the embodiment or example is included in at least one embodiment or example of the present disclosure. Thus, the appearances of the phrases such as "in some embodiments," "in one embodiment", "in an embodiment", "in another example," "in an example," "in a specific example," or "in some examples," in various places throughout this specification are not necessarily referring to the same embodiment or example of the present disclosure. Furthermore, the particular features, structures, materials, or characteristics may be combined in any suitable manner in one or more embodiments or examples.

Although explanatory embodiments have been shown and described, it would be appreciated by those skilled in the art that the above embodiments cannot be construed to limit the present disclosure, and changes, alternatives, and modifications can be made in the embodiments without departing from spirit, principles and scope of the present disclosure.

What is claimed is:

1. An electronic device, comprising:
   a coil, a chip with a contact-less function, a rectifier and a switcher, wherein the switcher is connected between the coil and the chip, a first output terminal of the coil is electrically connected to a first input terminal of the rectifier and is electrically connected to a second input terminal of the chip via the switcher, wherein:
   the coil is configured to sense a field and to output an alternating current (AC) signal via the first output terminal;
   the rectifier is configured to receive the AC signal input by the coil via the first input terminal, and to output electric power via a second output terminal of the rectifier; and
   the switcher is configured to connect the coil to the chip under an input operating voltage, and to control connection and disconnection of the coil and the chip according to a control signal when the control signal is received.

2. The electronic device according to claim 1, wherein the input operating voltage is greater than or equal to a voltage output by the rectifier.

3. The electronic device according to claim 1, wherein the rectifier is electrically connected to the switcher and is configured to provide the input operating voltage to the switcher.

4. The electronic device according to claim 1, wherein the switcher is electrically connected to a control terminal of the chip and is configured to receive the control signal output via the control terminal of the chip.

5. The electronic device according to claim 1, further comprising:
   a microcontroller unit (MCU), wherein the switcher is electrically connected to a control terminal of the MCU and is configured to receive the control signal output via the control terminal of the MCU.

6. The electronic device according to claim 1, further comprising:
   a rechargeable battery, wherein the rectifier is electrically connected to the rechargeable battery and is configured to provide the electric power to the rechargeable battery.

7. The electronic device according to claim 1, wherein the switcher comprises:
   an AC input terminal, a third output terminal, a control module, a first ON/OFF circuit and a second ON/OFF circuit, wherein:
   the first ON/OFF circuit is provided to couple a first end of the AC input terminal and a first end of the third output terminal, and is configured to be controlled to transfer to an ON state or an OFF state, wherein a first path is switched on and a second path is switched off when the first ON/OFF circuit is in the ON state, the first path is switched off and the second path is switched on when the first ON/OFF circuit is in the OFF state, the first path and the second path are in opposite flow directions, and the first path is a path from the first end of the AC input terminal to the first end of the third output terminal or a path from the first end of the third output terminal to the first end of the AC input terminal;
   the second ON/OFF circuit is provided to couple a second end of the AC input terminal and a second end of the third output terminal, and is configured to be controlled to transfer to an ON state or an OFF state, wherein a third path is switched on and a fourth path is switched off when the second ON/OFF circuit is in the ON state, the third path is switched off and the fourth path is switched on when the second ON/OFF circuit is in the OFF state, the third path and the fourth path are in opposite flow directions, and the third path is a path from the second end of the AC input terminal to the second end of the third output terminal or a path from the second end of the third output terminal to the second end of the AC input terminal; and
   the control module is provided to couple the input operating voltage of the switcher and a common ground, and is configured to be controlled to transfer to an ON state or an OFF state, wherein the control module is configured to control the first ON/OFF circuit and the second ON/OFF circuit to transfer to the OFF state when the control module is in the ON state, and to control one of the first ON/OFF circuit and the second ON/OFF circuit to transfer to the ON state and the other one of the first ON-OFF circuit and the second ON-OFF circuit to transfer to the OFF state by cooperating with the AC input terminal when the control module is in the OFF state.

8. The electronic device according to claim 7, wherein:
   the second ON/OFF circuit comprises a second controllable switch and a second freewheeling conduction element;
   the second controllable switch comprises: a first connecting end, a second connecting end and a control end, the second freewheeling conduction element is connected between the first connecting end of the second controllable switch and the second connecting end of the second controllable switch, and a conducting direction of the second controllable switch is opposite to that of the second freewheeling conduction element; and the first connecting end of the second controllable switch is configured to be connected to the second end of the AC input terminal, the second connecting end of the second controllable switch is configured to be connected to the second end of the third output terminal, the control end of the second controllable switch is configured to receive the control signal from the control module and to switch on the third path and switch off the fourth path, or to switch on the fourth path and switch off the third path.

9. The electronic device according to claim 8, wherein the second controllable switch comprises a second MOSFET and a second bias resistor.

10. The electronic device according to claim 9, wherein the second MOSFET is an N-channel MOSFET, a source electrode of the second MOSFET is configured as the first connecting end of the second controllable switch, a drain electrode of the second MOSFET is configured as the second connecting end of the second controllable switch, a grid electrode of the second MOSFET is configured as the control end of the second controllable switch, a terminal of the second bias resistor is connected to the source electrode of the second MOSFET, and the other terminal of the second bias resistor is connected to the grid electrode of the second MOSFET.

11. The electronic device according to claim 9, wherein the second controllable switch further comprises: a fourth load component, wherein the grid electrode of the second MOSFET is connected to the control module via the fourth load component, and wherein the fourth load component is a resistor or a fourth unidirectional conduction element, wherein the fourth unidirectional conduction element comprises a diode or a triode.

12. The electronic device according to claim 11, wherein the control module is a controllable switch comprising a first connecting end, a second connecting end and a control end, wherein the first connecting end of the control module is configured to be connected to the input operating voltage, the second connecting end of the control module is configured to be connected to a common ground, the control end of the control module is configured to receive the control signal from outside and to switch on or switch off according to the control signal, and the first connecting end of the control module is further configured to be connected to the first ON/OFF circuit and the second ON/OFF circuit respectively, and the control module is configured to control the first ON/OFF circuit and the second ON/OFF circuit to transfer to the OFF state when the control module is in the ON state, and to control either one of the first ON/OFF circuit and the second ON/OFF circuit to transfer to the ON state by cooperating with the AC input terminal when the control module is in the OFF state.

13. The electronic device according to claim 12, wherein the control module comprises a third MOSFET and a third bias resistor.

14. The electronic device according to claim 13, wherein the third MOSFET is an N-channel MOSFET, a drain electrode of the third MOSFET is configured as the first connecting end of the control module and is connected to the input operating voltage via the third bias resistor, a source electrode of the third MOSFET is configured as the second connecting end of the control module, a grid electrode of the third MOSFET is configured as the control end of the control module.

15. The electronic device according to claim 7, wherein: the first ON/OFF circuit comprises a first enhanced MOSFET, and/or, the second ON/OFF circuit comprises a second enhanced MOSFET.

16. The electronic device according to claim 15, wherein: the first ON/OFF circuit further comprises: a first load component, wherein a grid electrode of the first enhanced MOSFET is connected to the control module via the first load component; and/or the second ON/OFF circuit further comprises: a second load component, wherein a grid electrode of the second enhanced MOSFET is connected to the control module via the second load component.

17. The electronic device according to claim 7, wherein: the first ON/OFF circuit comprises a first controllable switch and a first freewheeling conduction element;

the first controllable switch comprises: a first connecting end, a second connecting end and a control end, wherein the first freewheeling conduction element is connected between the first connecting end of the first controllable switch and the second connecting end of the first controllable switch, and a conducting direction of the first freewheeling conduction element is opposite to that of the first controllable switch; and the first connecting end of the first controllable switch is configured to be connected to the first end of the AC input terminal, the second connecting end of the first controllable switch is configured to be connected to the first end of the third output terminal, the control end of the first controllable switch is configured to receive the control signal from the control module and to switch on the first path and switch off the second path, or to switch on the second path and switch off the first path.

18. The electronic device according to claim 17, wherein the first controllable switch comprises a first MOSFET and a first bias resistor.

19. The electronic device according to claim 18, wherein the first MOSFET is an N-channel MOSFET, a source electrode of the first MOSFET is configured as the first connecting end of the first controllable switch, a drain electrode of the first MOSFET is configured as the second connecting end of the first controllable switch, a grid electrode of the first MOSFET is configured as the control end of the first controllable switch, a terminal of the first bias resistor is connected to the source electrode of the first MOSFET, and the other terminal of the first bias resistor is connected to the grid electrode of the first MOSFET.

20. The electronic device according to claim 18, wherein the first controllable switch further comprises: a third load component, wherein the grid electrode of the first MOSFET is connected to the control module via the third load component.

* * * * *